(12) United States Patent
Choi et al.

(10) Patent No.: US 11,922,648 B2
(45) Date of Patent: Mar. 5, 2024

(54) METHOD FOR PROVIDING IMAGE AND ELECTRONIC DEVICE SUPPORTING THE SAME

(71) Applicant: Samsung Electronics Co., Ltd., Gyeonggi-do (KR)

(72) Inventors: Gwangho Choi, Gyeonggi-do (KR); Sungeun Kim, Gyeonggi-do (KR); Hanul Moon, Gyeonggi-do (KR); Insun Song, Gyeonggi-do (KR); Daehan Wi, Gyeonggi-do (KR); Sunggeun Yim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 110 days.

(21) Appl. No.: 17/743,851

(22) Filed: May 13, 2022

(65) Prior Publication Data

US 2022/0366584 A1 Nov. 17, 2022

Related U.S. Application Data

(63) Continuation of application No. PCT/KR2022/006910, filed on May 13, 2022.

(30) Foreign Application Priority Data

May 13, 2021 (KR) .................... 10-2021-0062258

(51) Int. Cl.
  *G06T 7/521* (2017.01)
  *G01S 17/86* (2020.01)
  (Continued)

(52) U.S. Cl.
  CPC .............. *G06T 7/521* (2017.01); *G01S 17/86* (2020.01); *G01S 17/89* (2013.01); *H04N 23/56* (2023.01);
  (Continued)

(58) Field of Classification Search
  CPC .......... G01S 17/10; G01S 17/86; G01S 17/89; G06T 2207/10028; G06T 7/521; H04N 23/45; H04N 23/56; H04N 23/69; H04N 23/71; H04N 23/745; H04N 23/90
  See application file for complete search history.

(56) References Cited

U.S. PATENT DOCUMENTS 7,605,753 B2   10/2009   Landmark
8,022,869 B2   9/2011    Wu
(Continued)

FOREIGN PATENT DOCUMENTS

CN   110784653   2/2020
CN   111031278   4/2020
(Continued)

OTHER PUBLICATIONS

International Search Report dated Aug. 11, 2022 issued in counterpart application No. PCT/KR2022/006910, 9 pages.

*Primary Examiner* — Antoinette T Spinks
(74) *Attorney, Agent, or Firm* — The Farrell Law Firm, P.C.

(57) ABSTRACT

An electronic device and method are provided for obtaining an image. An electronic device may include cameras; a distance sensor including a light-emitting part and a light-receiving part; and a processor. The processor may identify a range corresponding to a zoom magnification for obtaining an image, obtain, based on light emitted from the light-emitting part and received by regions of the light-receiving part, signals corresponding to the regions of the light-receiving part, identify first peaks of the signals, obtain, based on the first peaks, first distances, identify whether a distance that is greater than or equal to a first distance corresponding to the identified range exists among the first distances, identify, based on identifying that the distance that is greater than or equal to the first distance exists, whether a maximum value of the first peaks is less than a first value, and determine a camera for obtaining the image among the
(Continued)

multiple cameras, based whether the distance that is greater than or equal to the first distance exists and/or whether the maximum value of the one or more first peaks is less than the first value.

20 Claims, 16 Drawing Sheets

(51) Int. Cl.
    *G01S 17/89*     (2020.01)
    *H04N 23/56*     (2023.01)
    *H04N 23/71*     (2023.01)
    *H04N 23/745*     (2023.01)
    *H04N 23/90*     (2023.01)

(52) U.S. Cl.
    CPC ........... *H04N 23/71* (2023.01); *H04N 23/745* (2023.01); *H04N 23/90* (2023.01); *G06T 2207/10028* (2013.01)

(56) References Cited

U.S. PATENT DOCUMENTS

| | | |
|---|---|---|
| 8,390,513 B2 | 3/2013 | Young |
| 9,008,249 B2 | 4/2015 | Wu |
| 9,065,686 B2 | 6/2015 | Sun |
| 2004/0156425 A1 | 8/2004 | Manz |
| 2005/0285781 A1 | 12/2005 | Park |
| 2014/0132446 A1 | 5/2014 | Lennen |
| 2015/0204970 A1 | 7/2015 | Jeong et al. |
| 2016/0306049 A1 | 10/2016 | Tangudu et al. |
| 2019/0273873 A1 | 9/2019 | Mao et al. |
| 2020/0026031 A1 | 1/2020 | Li |
| 2020/0124733 A1 | 4/2020 | Ahn et al. |
| 2020/0256675 A1 | 8/2020 | Otsuka et al. |
| 2021/0084223 A1 | 3/2021 | Khandelwal et al. |
| 2021/0333372 A1 | 10/2021 | Akahori |
| 2022/0128659 A1 | 4/2022 | Lee et al. |
| 2022/0132043 A1 | 4/2022 | Park et al. |
| 2022/0321789 A1 | 10/2022 | Kim et al. |

FOREIGN PATENT DOCUMENTS

| | | |
|---|---|---|
| EP | 1 862 816 | 3/2013 |
| KR | 1020140097876 | 8/2014 |
| KR | 1020150129187 | 11/2015 |
| KR | 1020180096332 | 8/2018 |
| KR | 1020190005377 | 1/2019 |
| KR | 1020200091197 | 7/2020 |
| KR | 10-2159994 | 9/2020 |
| KR | 1020200136148 | 12/2020 |
| KR | 1020210006605 | 1/2021 |
| KR | 10-2211153 | 2/2021 |
| WO | WO 2020/188782 | 9/2020 |

711

| 18 | 19 | 17 | 39 | 188 | 117 | 122 | 111 |
|----|----|----|----|-----|-----|-----|-----|
| 4  | 23 | 9  | 192| 258 | 264 | 199 | 169 |
| 15 | 14 | 15 | 97 | 243 | 192 | 151 | 203 |
| 14 | 16 | 8  | 78 | 204 | 192 | 173 | 210 |
| 72 | 31 | 22 | 22 | 37  | 62  | 130 | 81  |
| 35 | 48 | 46 | 15 | 23  | 28  | 70  | 29  |
| 19 | 17 | 13 | 6  | 9   | 14  | 18  | 0   |
| 0  | 8  | 0  | 5  | 0   | 8   | 7   | 427 |

711-1     711-2

712

| 68  | 79  | 89  | 104 | 148 | 102 | 73  | 82 |
|-----|-----|-----|-----|-----|-----|-----|----|
| 56  | 80  | 86  | 150 | 336 | 235 | 111 | 71 |
| 44  | 59  | 52  | 88  | 137 | 106 | 76  | 68 |
| 46  | 54  | 57  | 78  | 95  | 92  | 82  | 55 |
| 54  | 81  | 71  | 72  | 66  | 72  | 58  | 52 |
| 65  | 111 | 118 | 103 | 88  | 67  | 56  | 54 |
| 110 | 142 | 123 | 131 | 113 | 80  | 64  | 57 |
| 403 | 292 | 210 | 171 | 196 | 199 | 180 | 66 |

712-1 (row 3)     712-2

FIG.7A

Table 721:

| 10 | 13 | 15 | 13 | 11 | 12 | 14 | 6  |
|----|----|----|----|----|----|----|----|
| 11 | 12 | 13 | 13 | 13 | 11 | 11 | 12 |
| 10 | 15 | 13 | 13 | 13 | 10 | 8  | 10 |
| 11 | 15 | 14 | 10 | 10 | 10 | 10 | 8  |
| 6  | 10 | 10 | 7  | 8  | 8  | 7  | 9  |
| 7  | 5  | 7  | 5  | 7  | 6  | 6  | 3  |
| 3  | 3  | 5  | 6  | 6  | 6  | 5  | 1  |
| N  | 1  | 4  | 5  | 3  | 4  | 5  | 1  |

Table 722:

| 1570 | 1596 | 1546 | 1185 | 800  | 528  | 354  | 358  |
|------|------|------|------|------|------|------|------|
| 1267 | 1475 | 1349 | 983  | 718  | 526  | 401  | 330  |
| 986  | 1124 | 1001 | 716  | 556  | 511  | 430  | 338  |
| 656  | 750  | 720  | 580  | 511  | 502  | 431  | 349  |
| 440  | 537  | 545  | 537  | 535  | 522  | 453  | 401  |
| 343  | 386  | 460  | 535  | 538  | 495  | 442  | 504  |
| 394  | 387  | 442  | 495  | 531  | 570  | 601  | 693  |
| 1059 | 825  | 734  | 775  | 950  | 1182 | 1652 | 2576 |

FIG.7B 731-1 731

| N | 2 | 7 | 3 | 10 | 3 | 7 | N |
|---|---|---|---|----|---|---|---|
| 7 | 6 | 6 | 6 | 7 | 9 | 9 | 8 |
| 10 | 11 | 10 | 9 | 13 | 10 | 13 | 11 |
| 12 | 11 | 8 | 15 | 13 | 9 | 12 | 10 |
| 12 | 11 | 12 | 15 | 17 | 11 | 14 | 11 |
| 12 | 14 | 13 | 12 | 14 | 12 | 14 | 14 |
| 12 | 13 | 15 | 15 | 14 | 14 | 14 | 13 |
| N | 15 | 13 | 16 | 15 | 17 | 17 | N |

731-2 731-3

732-2 732

| 292337 | 232344 | 215475 | 203977 | 204659 | 192860 | 197969 | 213248 |
|--------|--------|--------|--------|--------|--------|--------|--------|
| 176685 | 175821 | 185693 | 193630 | 196795 | 183223 | 171879 | 151395 |
| 141576 | 155005 | 163784 | 152009 | 147762 | 148798 | 155287 | 130876 |
| 119858 | 138553 | 133709 | 117736 | 113001 | 122723 | 136982 | 119587 |
| 103193 | 118705 | 117742 | 102947 | 100734 | 108392 | 120610 | 105782 |
| 87666 | 89798 | 104211 | 103079 | 99674 | 101252 | 102004 | 92339 |
| 79174 | 81937 | 88126 | 91686 | 90389 | 85633 | 81523 | 79489 |
| 95247 | 75125 | 72764 | 76991 | 73724 | 71854 | 72810 | 81930 |

| 15 | 12 | 13 | 9  | 9  | 11 | 14 | 10 |
|----|----|----|----|----|----|----|----|
| 13 | 12 | 11 | 3  | 5  | 11 | 11 | 10 |
| 12 | 11 | 9  | 5  | 5  | 9  | 10 | 11 |
| 13 | 8  | 5  | 8  | 7  | 8  | 8  | 8  |
| 13 | 11 | 10 | 6  | 8  | 10 | 11 | 11 |
| 16 | 14 | 14 | 12 | 13 | 14 | 15 | 14 |
| 15 | 17 | 18 | 16 | 15 | 19 | 16 | 14 |
| 14 | 16 | 19 | 19 | 18 | 17 | 11 | 16 |

741-2

742-2, 742

| 170475 | 165153 | 188290 | 218820 | 205712 | 171552 | 156716 | 168669 |
|--------|--------|--------|--------|--------|--------|--------|--------|
| 167814 | 183230 | 217210 | 262703 | 235585 | 172040 | 164880 | 149099 |
| 171831 | 198741 | 208904 | 242457 | 216648 | 184682 | 174284 | 146060 |
| 161204 | 186838 | 199163 | 197549 | 182911 | 176260 | 176932 | 136000 |
| 121542 | 164265 | 166899 | 168896 | 162117 | 153003 | 142318 | 103100 |
| 62441  | 85496  | 94707  | 103372 | 93550  | 77658  | 65379  | 50546  |
| 32394  | 32291  | 31225  | 33100  | 30699  | 27827  | 26526  | 29037  |
| 54833  | 42430  | 35055  | 32771  | 28031  | 37491  | 49402  | 74673  |

METHOD FOR PROVIDING IMAGE AND ELECTRONIC DEVICE SUPPORTING THE SAME

CROSS-REFERENCE TO RELATED APPLICATIONS

This application is a Bypass Continuation Application of International Application No. PCT/KR2022/006910, which was filed on May 13, 2022, and is based on and claims priority under 35 U.S.C. § 119 to Korean Patent Application No. 10-2021-0062258, which was filed in the Korean Intellectual Property Office on May 13, 2021, the entire disclosure of each of which is incorporated herein by reference.

BACKGROUND

1. Field

The disclosure relates generally to a method for providing images, and an electronic device supporting the same.

2. Description of Related Art

An electronic device (e.g., a smartphone) may include multiple cameras. For example, an electronic device may include one or more front surface cameras, and one or more rear surface cameras.

The electronic device may automatically select one of the cameras for obtaining an image, based on the distance between the electronic device and a subject being photographed. For example, the electronic device may determine that a camera having a focal length that increases in proportion to the distance between the electronic device and the subject is the optimal camera for obtaining the image.

An electronic device may also include a range sensor for measuring the distance between the electronic device and the subject.

However, if a distance measured through the range sensor differs from the actual distance between the electronic device and the subject, the electronic device may not select the best a camera for the actual distance between the electronic device and the subject. For example, if the range sensor is covered by foreign materials or user (for example, user's fingers), a distance (for example, distorted distance) different from the actual distance between the electronic device and the subject may be measured as a result of the influence of the foreign materials or user. The electronic device may select, from the multiple cameras, a camera for obtaining images, based on a distance different from the actual distance between the electronic device and the subject. In such a case, the quality of images obtained by the electronic device may be degraded.

SUMMARY

The disclosure has been made to address at least the above-mentioned problems and/or disadvantages and to provide at least the advantages described below.

An aspect of the disclosure is to provide a method for providing images and an electronic device supporting the same, wherein even when a range sensor is affected by foreign materials or a user, an optimal camera can still be selected from multiple cameras included in the electronic device by using a signal obtained through the range sensor.

In accordance with an aspect of the disclosure, an electronic device is provided, which includes multiple cameras, a distance sensor including a light-emitting part and a light-receiving part, and at least one processor. The at least one processor is configured to identify a range corresponding to a zoom magnification for obtaining an image, obtain, based on light emitted from the light-emitting part and received by one or more regions of the light-receiving part, one or more signals corresponding to the one or more regions of the light-receiving part, identify one or more first peaks of the one or more signals, obtain, based on the one or more first peaks, one or more first distances, identify whether a distance that is greater than or equal to a first distance corresponding to the identified range exists among the one or more first distances, identify, based on identifying that the distance that is greater than or equal to the first distance exists, whether a maximum value of the one or more first peaks is less than a first value, and determine a camera for obtaining the image among the multiple cameras, based on at least one of whether the distance that is greater than or equal to the first distance exists or whether the maximum value of the one or more first peaks is less than the first value.

In accordance with another aspect of the disclosure, a method is provided for an electronic device. The method include identifying a range corresponding to a zoom magnification for obtaining an image; obtaining, based on light emitted from a light-emitting part of a distance sensor of the electronic device and received by one or more regions of a light-receiving part of the distance sensor, one or more signals corresponding to the one or more regions of the light-receiving part; identifying one or more first peaks of the one or more signals; obtaining one or more first distances, based on the one or more first peaks; identifying whether a distance that is greater than or equal to a first distance corresponding to the identified range exists among the one or more first distances; identifying, based on identifying that the distance that is greater than or equal to the first distance exists, whether a maximum value of the one or more first peaks is less than a first value; and determining a camera for obtaining the image among multiple cameras included in the electronic device, based on at least one of whether the distance that is greater than or equal to the first distance exists or whether the maximum value of the one or more first peaks is less than the designated first value.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIGS. 7A and 7B illustrate values of second distances and second peaks obtained while a distance sensor is partially blocked by an obstacle according to an embodiment;

FIG. 7C illustrates values of second distances and second peaks obtained while a distance sensor is entirely blocked by an obstacle according to an embodiment;

FIG. 7D illustrates values of second distances and second peaks obtained while a subject is within a specific distance from a distance sensor according to an embodiment;

DETAILED DESCRIPTION

Hereinafter, various embodiments of the disclosure will be described with reference to the attached drawings. However, these embodiments are not intended to limit the disclosure to specific embodiments but construed as including various modifications, equivalents, or alternatives of the embodiments of the disclosure.

Figure 1:
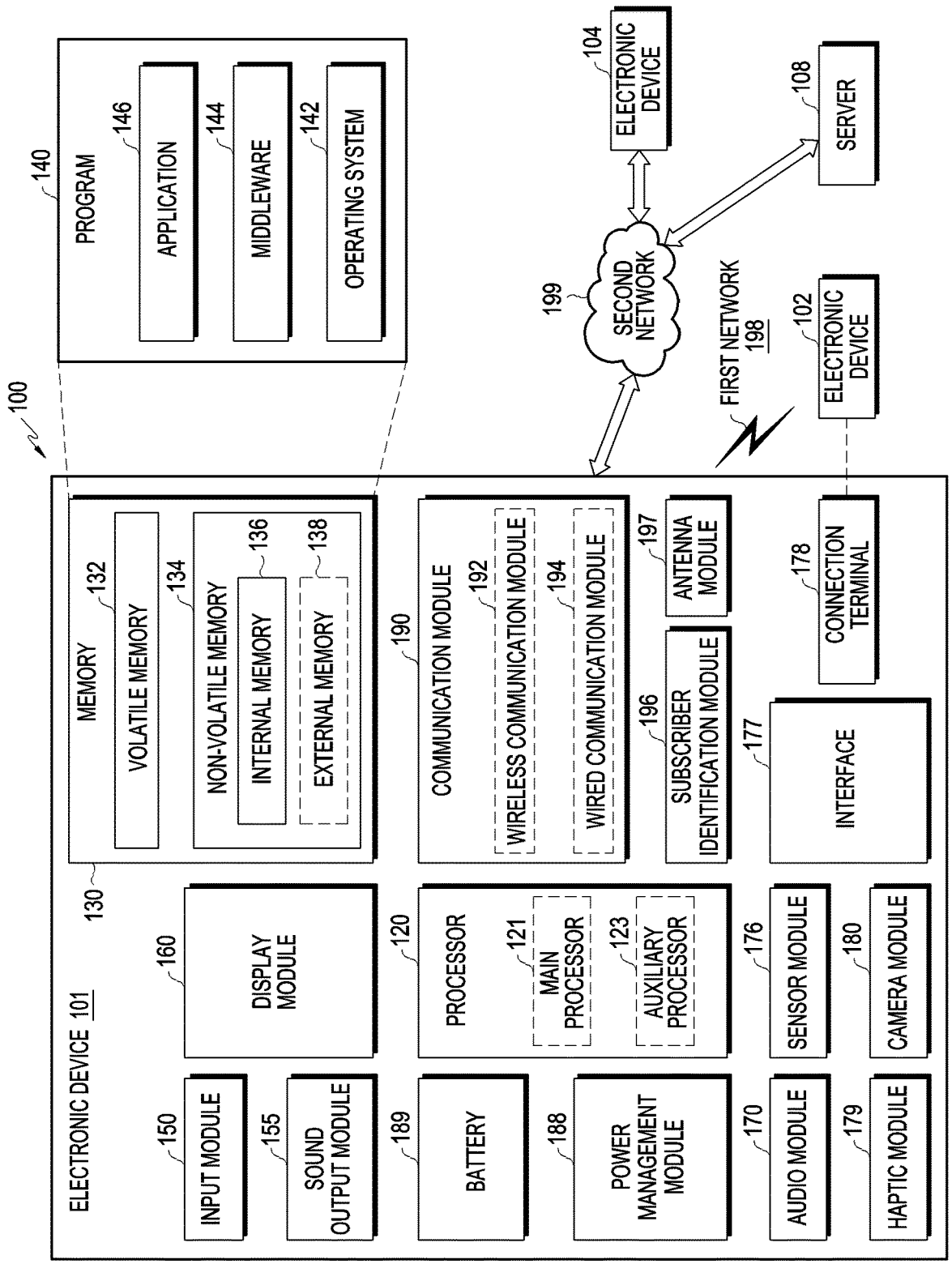
FIG. 1 illustrates an electronic device in a network environment according to an embodiment.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101 and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These, various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
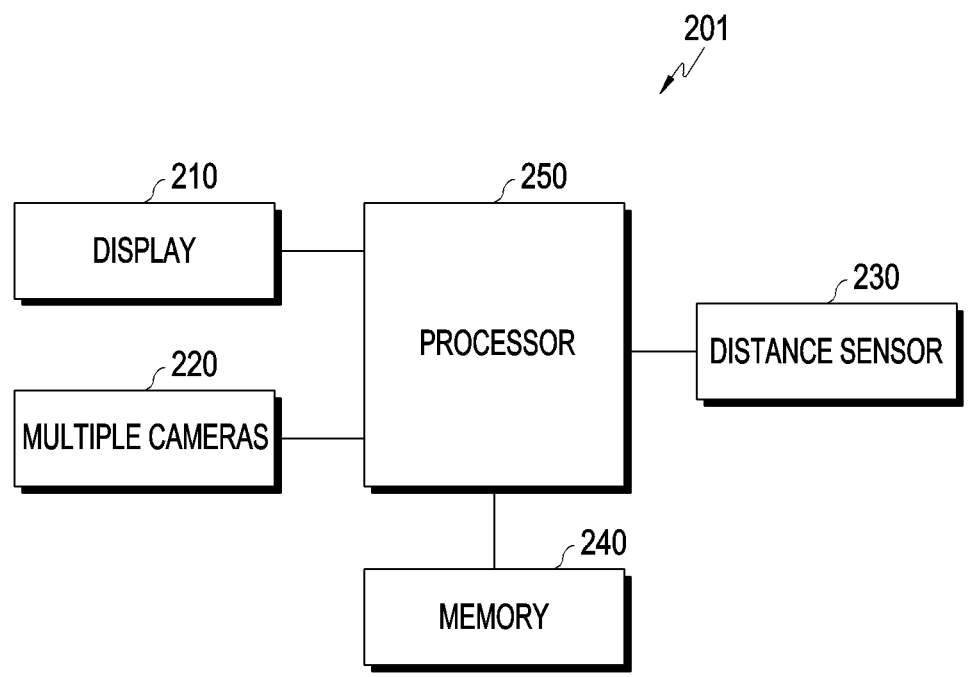
FIG. 2 illustrates an electronic device according to an embodiment.

FIG. 2 illustrates an electronic device according to an embodiment.

Referring to FIG. 2, an electronic device 201 includes a display 210, multiple cameras 220, a distance sensor 230, a memory 240, and a processor 250.

The display 210 may display an image (e.g., a dynamic image and/or still image) obtained through a camera. The display 210 may display a preview image obtained through a camera when a camera application is executed, and when an image is obtained through a camera, the display 210 may display the obtained image.

Figure 3:
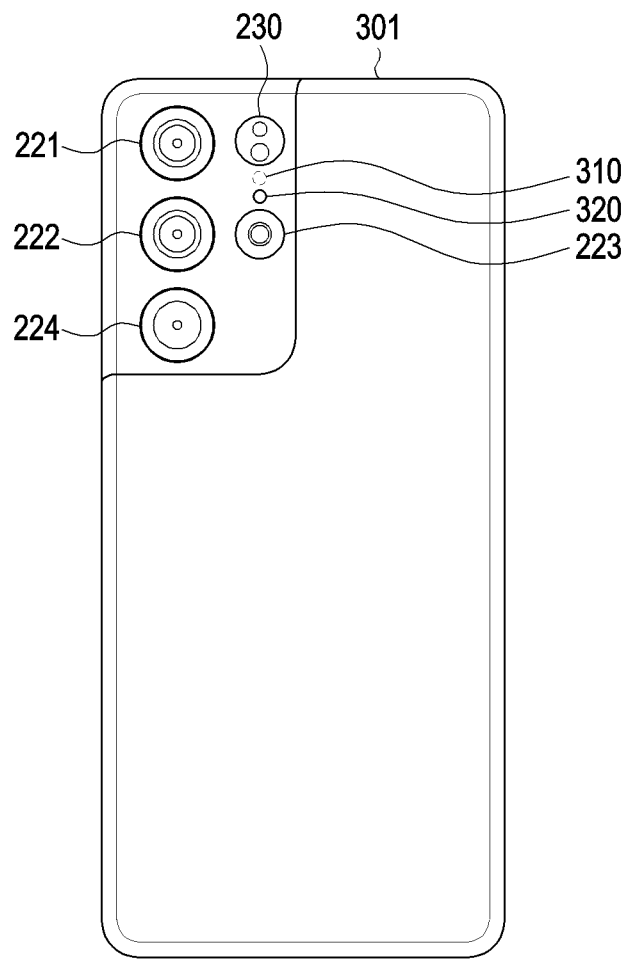
FIG. 3 illustrates a rear surface of an electronic device according to an embodiment.

FIG. 3 illustrates a rear surface of an electronic device according to an embodiment.

Referring to FIG. 3, a rear surface an electronic device 301 includes camera 1 221, camera 2 222, camera 3 223, camera 4 224, a distance sensor 230, a flicker sensor 310, and a flash light-emitting diode (LED) 320.

Camera 1 221, camera 2 222, camera 3 223, and camera 4 224 may be referred as a super wide-angle camera, an optical camera, a first telephoto camera, and a second telephoto camera, respectively. Camera 1 221, camera 2 222, camera 3 223, and camera 4 224 may have different angles of view, e.g., about 120°, about 83°, about 35°, and about 10°, respectively. Camera 1 221, camera 2 222, camera 3 223, and camera 4 224 may have different focal distances. For example, camera 1 221, camera 2 222, camera 3 223, and camera 4 224 may have shorter focal distances in the order of camera 1 221, camera 2 222, camera 3 223, and camera 4 224.

Although FIG. 3 illustrates the electronic device 301 including four cameras at the rear surface thereof, the disclosure is not limited thereto. For example, the electronic device 301 may include a different number of cameras at the rear surface.

Although not visible in FIG. 3, a front surface of the electronic device 301 may include at least one camera.

Hereinafter, two or more cameras arranged on the rear surface of an electronic device may be referred as "multiple cameras".

The flicker sensor 310 may sense flickering of an artificial light source disposed in a surrounding environment of the electronic device 301. For example, the flicker sensor 310 may be configured to obtain a frequency at which the artificial light source emits light, based on ambient light received from a surrounding environment. The flicker sensor 310 in FIG. 3 is disposed adjacent to the distance sensor 230.

Additionally, the electronic device 301 may include an illuminance sensor configured to measure brightness of a surrounding environment of the electronic device 301, based on light received from the surrounding environment of the electronic device 301.

Although FIG. 3 illustrates the multiple cameras 221, 222, 223, and 224, the distance sensor 230, the flicker sensor 310, and the flash LED 320 are arranged on the rear surface of the electronic device 301, the disclosure is not limited thereto. For example, the electronic device 301 may not include the flicker sensor 310 (and/or the illuminance sensor) and/or the flash LED 320.

The distance sensor 230 may measure a distance between the electronic device 301 (e.g., the distance sensor 230) and an object to be photographed. Herein, an object to be photographed by a user will be referred as a "subject" and a foreign substance or a user's finger blocking the distance sensor 230 will be referred as an "obstacle".

The distance sensor 230 may measure a distance between the electronic device 301 and a subject based on a moving speed and a moving time during which a designated kind of signal emitted from the distance sensor 230 is incident to the distance sensor 230 after reflected by the subject. The distance sensor 230 may be implemented according to the designated kind of a signal to be used by the distance sensor 230, by using a sonic method (e.g., an ultrasonic sensor), an infrared method (e.g., an infrared sensor), a laser method (e.g., a light detection and ranging (LIDAR) sensor), a radio wave method (e.g., a radio detecting and ranging (RADAR) sensor), and/or an optical method (e.g., a camera sensor (passive sensor)).

Figure 4A:
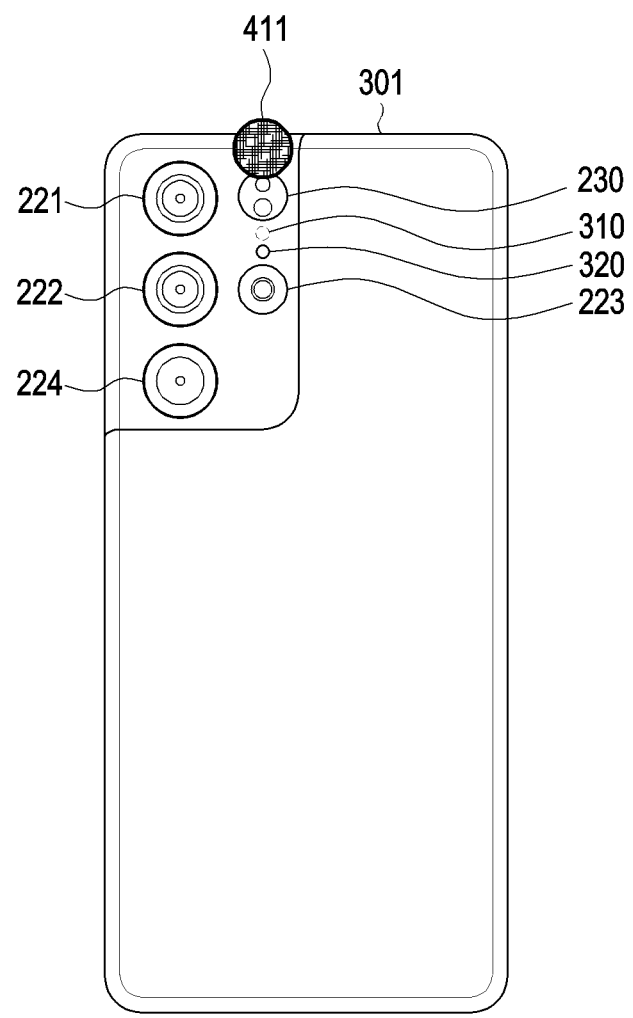
FIGS. 4A to 4C illustrate a distance sensor blocked by an obstacle according to an embodiment.
Figure 4B:
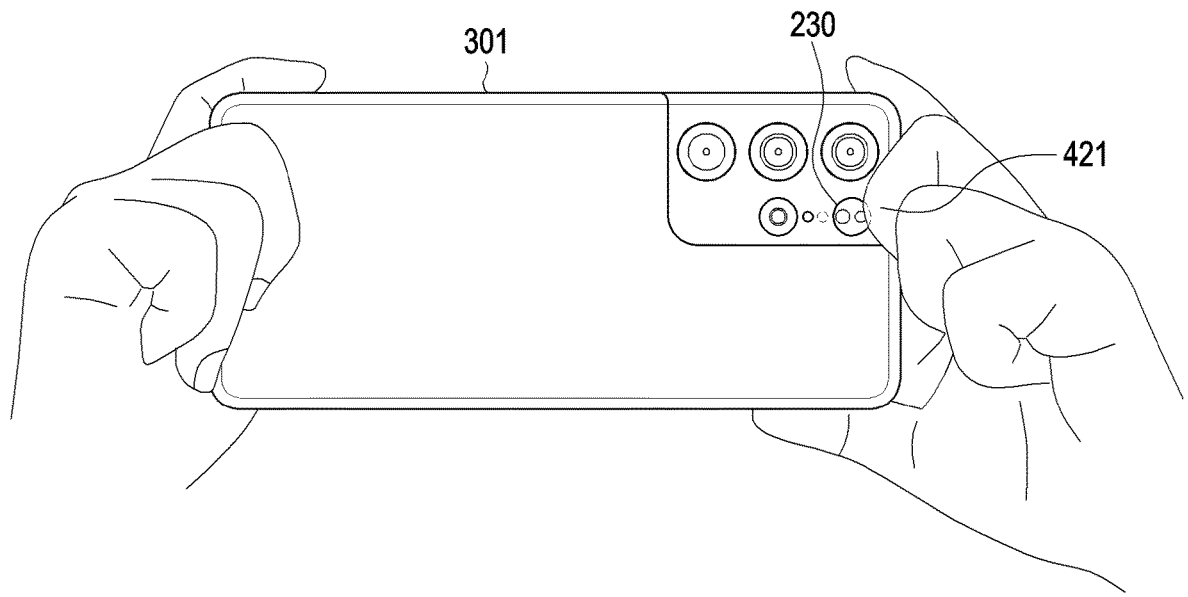
Figure 4C:
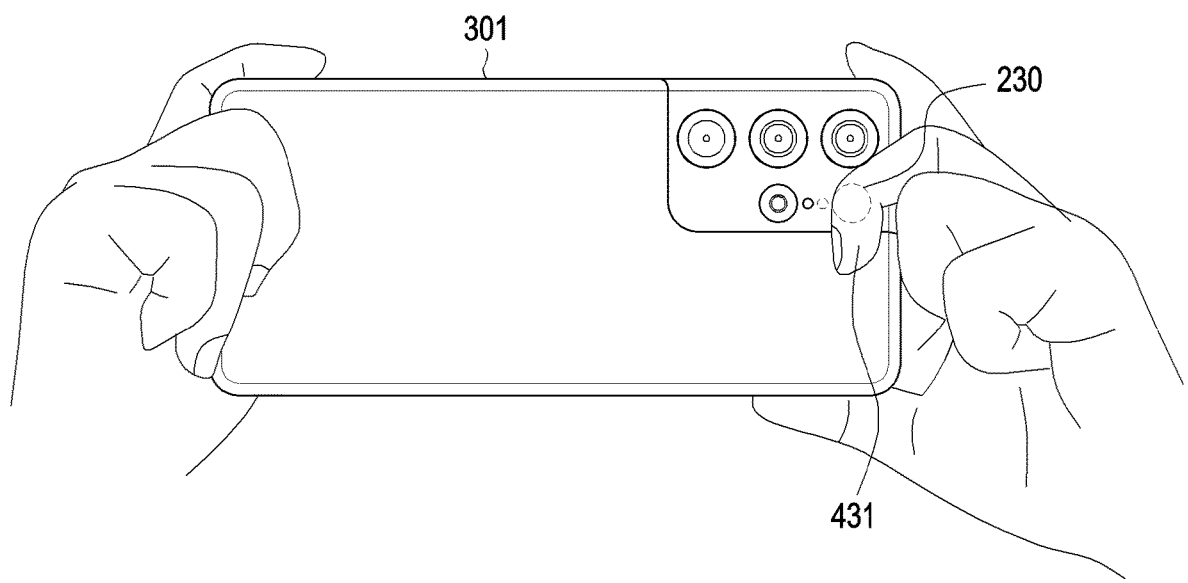

FIGS. 4A to 4C illustrate a distance sensor being blocked by an obstacle according to an embodiment.

Referring to FIG. 4A, the distance sensor 230 is partially blocked by a foreign substance (e.g., dirt) on the electronic device 301 in an experimental environment. Although the distance sensor 230 may still receive light when the distance sensor 230 is partially blocked by the foreign substance 411, the received light is affected by the foreign substance. For example, when the foreign substance 411 is positioned within an angle of view of a light-emitting part (and an angle of view of a light-receiving part) of the distance sensor 230, the distance sensor 230 may receive light reflected by the subject and light reflected by the foreign substance 411 after having been emitted from the light-emitting part of the distance sensor 230.

Referring to FIG. 4B, the distance sensor 230 is partially blocked by a finger 421 of the user gripping the electronic device 301. When a portion of the distance sensor 230 is blocked by the finger 421, the light received by the distance sensor 230 may be affected by the finger 421. For example, when the finger 421 is positioned within an angle of view of a light-emitting part (and an angle of view of a light-receiving part), the distance sensor 230 may receive light reflected by the subject and light reflected by the finger 421 after having been emitted from the light-emitting part of the distance sensor 230.

Referring to FIG. 4C, the distance sensor 230 is entirely blocked by a finger 431 of the user gripping the electronic device 301 (for example, the distance sensor 230 is entirely covered by the finger 431). When the distance sensor 230 is entirely blocked by the finger 431, as only the finger 431 is positioned within an angle of view of the light-emitting part and an angle of view of the light-receiving part of the distance sensor 230, the distance sensor 230 may receive only the light reflected by the finger 431 after having been emitted from the light-emitting part of the distance sensor 230 without reception of light reflected by the subject after having been emitted by the light-emitting part of the distance sensor 230 due to the finger 431.

Although not illustrated in FIGS. 4A to 4C, the flicker sensor 310 and the entirety of the distance sensor 230 may be blocked by an obstacle. For example, the entirety of the distance sensor 230 and the flicker sensor 310 disposed adjacent to the distance sensor 230 may be blocked by the obstacle.

The distance sensor 230 (and/or the processor 250) may obtain a signal, based on the light reflected by the subject and/or the obstacle after having been emitted from the light-emitting part.

Figure 5:
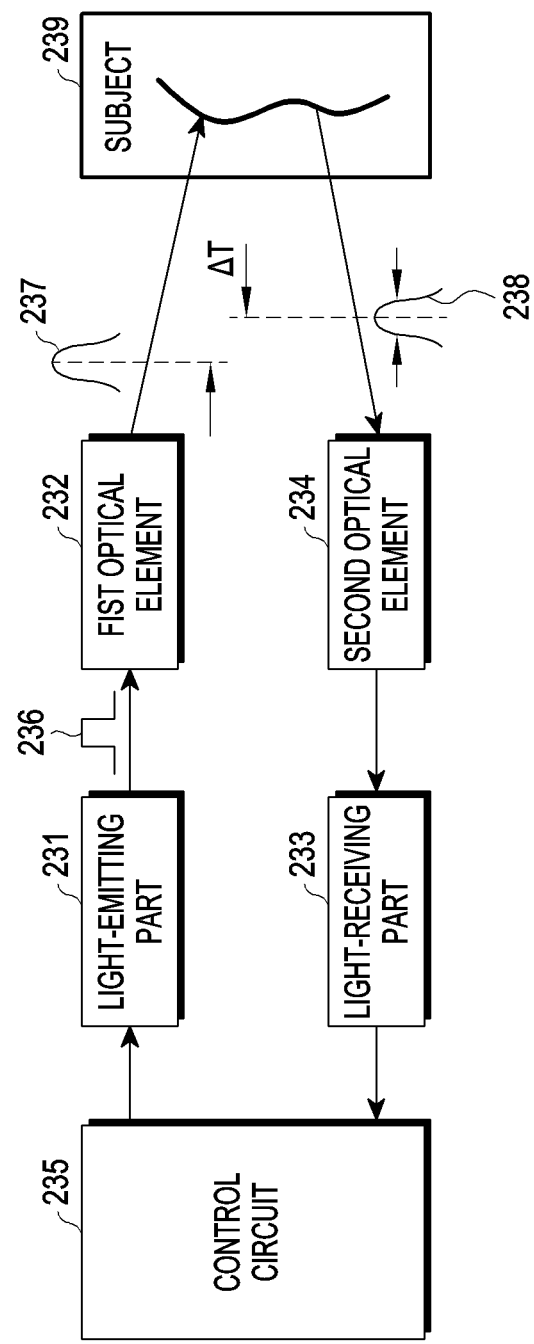
FIG. 5 illustrates a distance sensor according to an embodiment.

FIG. 5 illustrates a distance sensor according to an embodiment.

Referring to FIG. 5, a distance sensor includes a light-emitting part 231, a first optical element 232, a light-receiving part 233, a second optical element 234, and a control circuit 235. The distance sensor in FIG. 5 may use a direct time-of flight (TOF) method. However, the distance sensor is not limited to a specific method. For example, the distance sensor may use an indirect TOF method. At least a portion of the following embodiments may be identically or similarly applied to the case in which the distance sensor 230 includes a distance sensor using an indirect TOF method, as well.

The light-emitting part 231 may emit light a "photon") having a pulse. The light-emitting part 231 may include a laser (e.g., vertical cavity surface emitting lasers (VCSELs) and/or edge-emitting laser) or LEDs, which emit light 236 having a pulse.

The first optical element 232 may include a first lens and/or a diffuser. The first lens may include a micro lens. The light 236 emitted from the light-emitting part 231 may be uniformly diffused together with the light 237 having a pulse through the first lens and/or the diffuser.

The light-receiving part 233 may receive, through the second optical element 234 (e.g., a macro lens), the light 238 incident after the diffused light 237 is reflected by the subject 239.

The light-receiving part 233 may include multiple regions configured to receive the light 238.

The multiple regions of the light-receiving part 233 may include one or more photo detectors (or "pixels") (e.g., single-photon avalanche diodes (SPADs), avalanche diodes (APDs), or silicon photomultipliers (SiPMs)). For example, the multiple regions of the light-receiving part 233 may include 64 multiple regions and each of 64 regions may include one or more photo detectors.

At least a portion of the multiple regions of the light-receiving part 233 may correspond to the multiple cameras. For example, when camera 1 221 of the multiple cameras is used to obtain an image, one or more first regions (for example, one or more first regions, among the multiple regions of the light-receiving part 233, having an angle of view overlapping with at least a portion of an angle of view of camera 1 221) among multiple regions of the light-receiving part 233 may be used to measure a distance between the electronic device and the subject 239. For another example, when camera 4 224 of the multiple cameras is used to obtain an image, one or more first regions and another one or more second regions (for example, one or more second regions, among the multiple regions of the light-receiving part 233, having an angle of view overlapping with at least a portion of an angle of view of camera 4 224) among multiple regions of the light-receiving part 233 may be used to measure a distance between the electronic device and the subject 239.

In an embodiment, the control circuit 235 may control an operation of the distance sensor 230. For example, the control circuit 235 may control (for example, timing control) a driving of the light-receiving part 233 and the light-emitting part 231. For another embodiment, the control circuit 235 may detect, by using a time-to-digital converter (TDC), a time difference $\Delta T$ between an emitting time (radiating time) of light emitted through the light-emitting part 231 and a receiving time of light received through the light-receiving part 233.

The control circuit 235 (or the processor 250) may obtain a distance between the electronic device and the subject 239, based on a speed of the light and the time difference $\Delta T$ between the emitting time (radiating time) of light emitted through the light-emitting part 231 and the receiving time of light received through the light-receiving part 233.

Figure 6:
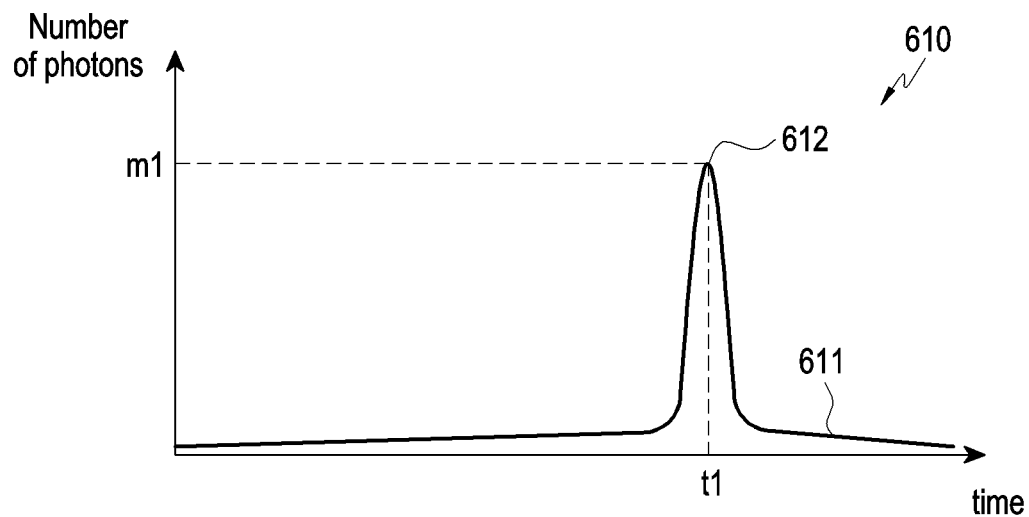
FIG. 6 illustrates a signal obtained through a distance sensor according to an embodiment.
Figure 6:
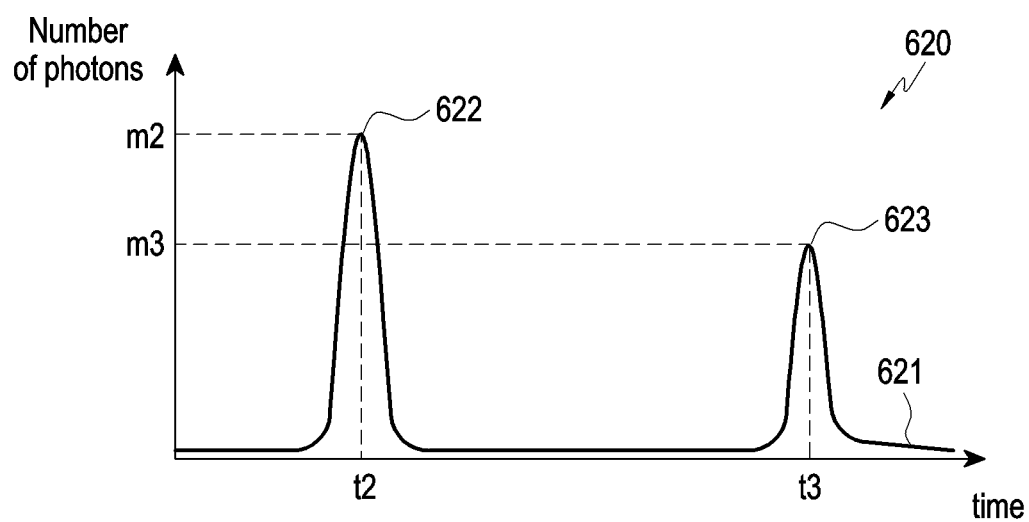

FIG. 6 illustrates signals obtained through a distance sensor according to an embodiment.

Referring to FIG. 6, reference numeral 610 and reference numeral 620 are graphs representing signals obtained by the control circuit 235 (or a processor in the electronic device) through one region of the light-receiving part.

In graphs 610 and 620, each of the first signal 611 and the second signal 621 may represent the number of photons acquired over a time t in one region of the light-receiving part 233. For example, the control circuit 235 may obtain the first signal 611 and the second signal 621 by counting the numbers of photons received over time in one region of the light-receiving part 233. The first signal 611 and the second signal 621 may be obtained during one cycle (for example, one cycle in which the light-receiving part 233 receives light, which corresponds to one cycle in which the light-emitting part 231 emits light having a pulse) in which the light-receiving part 233 receives light having a pulse.

In graphs 610 and 620, the first signal 611 and the second signal 621 each have one or more peaks. Hereinafter, a point having the largest number of photons within a portion of a signal having the number of photons greater than or equal to a threshold number will be referred to as a "peak (or peak point)", and data representing the number of photons corresponding to the peak will be referred to as a "value of a peak".

More specifically, the first signal 611 includes a peak 612, which represents the number (m1) of photons received at a time t1. The second signal 621 includes a peak 622 and a peak 623. A value of the peak 622 represents the number (m2) of photons received at a time t2, and a value of the peak 623 represents the number (m3) of photons received at a time t3.

When one subject exists in an angle of view of the distance sensor, one peak (e.g., the peak 612 in the first signal 611) may be obtained. That is, when one subject exists in an angle of view of the distance sensor, one peak (for example, the peak 612) may be obtained as the light emitted by the light-emitting part 231 is reflected by the one subject and received through one region of the light-receiving part 233. However, the disclosure is not limited thereto, and when the distance sensor is entirely blocked by an obstacle (e.g., a user finger), the light emitted by the light-emitting part 231 may be reflected by the obstacle (for example, the case in which the light emitted by the light-emitting part 231 is not incident to the subject 239 because of the obstacle and reflected by the obstacle) and received by one region of the light-receiving part 233, and thus one peak (for example, the peak 612) may also be obtained.

When an obstacle and one subject exist within an angle of view of the distance sensor 230, two peaks (e.g., the peak 622 and the peak 623 in the second signal 621) may be obtained. That is, when a portion of the distance sensor 230 is blocked by an obstacle (for example, a foreign substance or a user finger), the light emitted by the light-emitting part 231 may be reflected by the obstacle and received by one region of the light-receiving part 233, thus obtaining the peak 622, and the light emitted by the light-emitting part 231 may be reflected by the one subject and received by one region (for example, one region receiving the light emitted by the light-emitting part 231 and reflected by the obstacle) of the light-receiving part 233, thus obtaining the peak 623.

Although FIG. 6 shows that a signal received by one region of the light-receiving part 233 may have one peak or two peaks like the first signal 611 and the second signal 621, but the disclosure is not limited thereto. For example, a signal received by one region of the light-receiving part 233 may have three or more peaks according to the number of subjects existing within an angle of view of the distance sensor 230.

Hereinafter, peaks (for example, peaks obtained from all the signals obtained by one or more region) of one or more signals obtained by one or more regions (for example, among multiple regions, one or more regions used to determine a camera among multiple cameras for obtaining an image) among multiple regions included in the light-receiving part 233 will be referred to as "one or more first peaks". For example, in FIG. 6, the peak 612, the peak 622 and the peak 623 may be included in the one or more first peaks.

In addition, hereinafter, among the one or more first peaks, the peaks that are first obtained (i.e., fastest in time) from each of one or more signals obtained by one or more regions among the multiple regions included in the light-receiving part 233 will be referred as "one or more second peaks". For example, in graph 610, the peak 612 of the first signal may be included in the one or more second peaks, and in graph 620, the peak 622 first obtained among the peaks 622 and 623 of the second signal may be included in the one or more second peaks.

The control circuit 235 (or the processor 250 as illustrated in FIG. 2) may obtain one or more first distances corresponding to the one or more first peaks, based on the time at which the one or more first peaks have been obtained. For example, the control circuit 235 may obtain distance 1 representing a distance between the electronic device and the subject or a distance between the electronic device and the obstacle, based on the time t1 at which the peak 612 has been obtained (and the time at which light serving as the basis of the first signal has been emitted from the light-emitting part 231 and the speed of the light).

For another example, the control circuit 235 may obtain distance 2 and distance 3 representing a distance between the electronic device and the subject and/or a distance between the electronic device and the obstacle, based on the times t2 and t3 at which the peak 622 and the peak 623 have been obtained (and the time at which light serving as the basis of the second signal has been emitted from the light-emitting part 231 and the speed of the light). In FIG. 6, distance 1 corresponding to the peak 612, distance 2 corresponding to the peak 622, and distance 3 corresponding to the peak 623 may be included in the one or more first distances.

Hereinafter, among the one or more first distances, distances corresponding to the one or more second peaks will be referred as to "one or more second distances". For example, in FIG. 6, distance 1 corresponding to the peak 612, and distance 2 corresponding to the peak 622 may be included in the one or more second distances.

In an embodiment, a portion of operations performed by the control circuit 235 included in the distance sensor may be performed by a processor in an electronic device, the processor 250 as illustrated in FIG. 2.

Referring again to FIG. 2, the memory 240 may store information for performing operations for providing an image.

The processor 250 may control overall operations for performing operations for providing an image. The processor 250 may include one or more processors to perform operations for providing an image.

The processor 250 may determine, among the multiple cameras, a camera for obtaining an image, based on the one or more first distances, the one or more second distances, and/or values of the one or more first peaks.

The processor 250 may differently obtain the one or more first distances, the one or more second distances, and/or values of the one or more first peaks depending on the distance between the electronic device 201 and the subject, whether the distance sensor 230 is partially blocked by an obstacle, and/or whether the distance sensor 230 is entirely blocked by an obstacle.

FIGS. 7A and 7B illustrate second distances and values of second peaks obtained while a distance sensor is partially blocked by an obstacle according to an embodiment.

Referring to FIG. 7A, tables 711 and 712 represent second distances and values of second peaks obtained when a portion of a light-receiving part of a distance sensor is affected by an obstacle due to the distance sensor 230 being partially blocked by the obstacle, e.g., as illustrated in FIG. 4B.

Referring to FIG. 7B, tables 721 and 722 represent second distances and values of second peaks obtained when an entirety of the light-receiving part of the distance sensor is affected by an obstacle due to the distance sensor 230 being entirely blocked by the obstacle, e.g., as illustrated in FIG. 4C.

More specifically, FIGS. 7A and 7B represent second distances and values of second peaks obtained for 64 regions included in the light-receiving part of the distance sensor. However, the number of the regions included in the light-receiving part of the distance sensor is not limited to 64.

In table 711, a maximum distance among the second distances is about 427 (mm) (711-2) and a minimum distance is about 0 (mm) (711-1). In table 711, an average distance of the second distances is about 76 (mm). In table 711, the maximum distance may be obtained when the light having been emitted from the light-emitting part of the distance sensor is incident to the light-receiving part of the distance sensor after having been reflected by the subject. In table 711, the minimum distance may be obtained when the light having been emitted from the light-emitting part of the distance sensor is incident to the light-receiving part of the distance sensor after having been reflected by the obstacle.

In table 712, among values of the second peaks, a maximum value may be about 403 (712-2) (here, the maximum value about 403 may be data corresponding to the number (for example, m1 in reference numeral 610 and/or m2 in reference numeral 620) of photons forming the second peak (for example, the peak 612 and/or the peak 622)) and the minimum value may be about 44 (712-1).

In table 712, an average value of the second peaks is about 76. In table 712, the minimum value may be a value of a peak obtained when the light emitted from the light-emitting part 231 of the distance sensor is incident to the light-receiving part of the distance sensor after being reflected by the subject. In table 712, the maximum value may be a value of a peak obtained when the light emitted from the light-emitting part of the distance sensor is incident to the light-receiving part of the distance sensor after being reflected by the obstacle.

In table 721, the maximum distance among the second distances is about 15 (mm) (721-2) and the minimum distance is about 1 (mm) (721-1). In table an average distance of the second distances is about 8 (mm). In table 721, "N" 721-3 may represent a case in which reliability of the obtained distance is lower than designated reliability. In table 721, all of the second distances may be obtained when the light emitted from the light-emitting part of the distance sensor is incident to the light-receiving part of the distance sensor after being reflected by the obstacle.

In table 722, among values of the second peaks, a maximum value is about 2,576 (722-2) and the minimum value is about 330 (722-1). In table 722, an average value of the second peaks is about 729. In table 722, values of the second peaks may be values obtained when the light emitted from the light-emitting part 231 of the distance sensor is incident to the light-receiving part of the distance sensor after being reflected by the obstacle.

As illustrated in FIGS. 7A and 7B, a maximum value (e.g., about 2,576 (722-2)) of values of the second peaks, obtained while the distance sensor is partially blocked by an obstacle may be less than 10,000.

FIG. 7C illustrates second distances and values of second peaks while a distance sensor is entirely blocked by an obstacle according to an embodiment.

Referring to FIG. 7C tables 731 and 732 represent second distances and values of second peaks obtained for 64 multiple regions are included in the light-receiving part of the distance sensor.

In table 731, among the second distances, the maximum distance is about 17 (mm) (731-2) and the minimum distance is about 2 (mm) (731-1). In table 731, an average distance of the second distances is about 11 (mm). In table 731, "N" 731-3 may represent a case in which reliability of the obtained distance is lower than designated reliability. In table 731, all of the second distances may be obtained when the light emitted from the light-emitting part 231 of the distance sensor is incident to the light-receiving part of the distance sensor after being reflected by the obstacle.

In table 732, a maximum value among values of the second peaks is about 292,337 (732-2) and the minimum value is about 71,854 (732-1). In table 732, an average value of the second peaks is about 130,340. In table 732, values of the second peaks may be values of peaks obtained when the light emitted from the light-emitting part of the distance sensor is incident to the light-receiving part of the distance sensor after being reflected by the obstacle.

As shown in FIG. 7C, when the distance sensor is entirely blocked by an obstacle (for example, the distance sensor 230 is completely blocked by a user finger), there may be a value of a second peak that is larger than about 290,000 among values of the second peaks. For example, when the distance sensor is entirely blocked by an obstacle, a maximum value (e.g., about 292,337 (732-2)) among values of the second peaks may be larger than about 290,000.

FIG. 7D illustrates values of second distances and second peaks obtained while a subject is within a specific distance from a distance sensor according to an embodiment.

Referring to FIG. 7D, tables 741 and 742 represents values of second distances and second peaks obtained when a subject having bright colors (e.g., a desk with an ivory-colored surface) is positioned within a predetermined distance (e.g., about 50 (mm)) from the distance sensor.

In table 741, among the second distances, the maximum distance is about 19 (mm) (741-2) and the minimum distance is about 3 (mm) (741-1). In table 741, an average distance of the second distances is about 12 (mm).

In table 741, all the second distances may be obtained when the light emitted from the light-emitting part of the distance sensor is incident to the light-receiving part of the distance sensor after being reflected by the subject spaced about 10 apart from the distance sensor.

In table 742, among values of the second peaks, a maximum value is about 262,703 (742-2) and the minimum value is about 26,526 (742-1). In table 742, an average value of the second peaks is about 130,804. In table 742, a maximum value of the second peaks may be a value of peaks obtained when the light emitted from the light-emitting part of the distance sensor is incident to the light-receiving part of the distance sensor after being reflected by the subject spaced about 10 (mm) apart from the distance sensor.

As shown in FIG. 7d, when the subject is positioned within a predetermined distance (e.g., about 50 (mm)) from the distance sensor, the minimum value (e.g., about 26,526) of values of the second peaks may be a value larger than the value (e.g., about 10,000 or less) of the second peak, obtained when the distance sensor is partially blocked by an obstacle. When the subject is positioned within the predetermined distance from the distance sensor, a maximum value (e.g., about 262,703) of values of the second peaks may be a value smaller than the value (e.g., about 290,000) of the second peak, obtained when the distance sensor is completely blocked by an obstacle.

Although FIG. 7D shows the case that the desk with a surface having bright colors (for example, an ivory color) is the subject positioned within the predetermined distance (for example, about 50 (mm)) from the distance sensor, the value of the second peaks may be differently obtained depending on a color and/or a material (for example, a surface material of the subject) of the subject. For example, depending on a color and/or a material of the subject, the ratio at which the light emitted by the light-emitting part of the distance sensor is reflected by the subject may be different. For example, the ratio at which the light emitted by the light-emitting part of the distance sensor is reflected by the subject having dark colors may be smaller than that by the subject having bright colors. The ratio reflected by a black subject may have a reflectance of about 10%, lower than the ratio reflected by a white subject of about 88%.

As another example, for a subject having a rough surface, the total amount of light emitted from the light-emitting part of the distance sensor to be incident to the light-receiving part may be reduced due to irregular diffuse reflection on the rough surface of the subject, so that the reflection ratio may be lower than that of a subject having a flat surface material.

Depending on a color and/or a material of the subject (e.g., a surface material of the subject), values of the second peaks may be obtained differently.

When the subject is positioned within a predetermined distance (e.g., about 50 (mm)) from the distance sensor, even though the subject has a color and/or a material causing a low reflection ratio of light emitted from the light-emitting part of the distance sensor, the minimum value of the second peaks may be larger than the value (for example, about 10,000 or less) of the second peak, obtained when the distance sensor is partially blocked by an obstacle. When the subject is positioned within the predetermined distance (for example, about 50 (mm)) from the distance sensor, even though the subject has a color and/or a material causing a low reflection ratio of light emitted from the light-emitting part of the distance sensor, a maximum value of the second peaks may be smaller than the value (for example, about 290,000) of the second peak, obtained when the distance sensor is completely blocked by an obstacle.

According to an embodiment, an electronic device 101 may include a distance sensor 230 including multiple cameras 220, a light-emitting part 231, and a light-receiving part 233, and at least one processor 250 functionally connected to the multiple cameras 220 and the distance sensor 230. The at least one processor 250 is configured to identify a range corresponding to a zoom magnification for obtaining an image among multiple ranges related to a zoom magnification, obtain, based on light emitted from the light-emitting part 231 and received by one or more regions of the light-receiving part 233, one or more signals corresponding to the one or more regions, obtain one or more first distances, based on one or more first peaks of the one or more signals, identify whether a distance greater than or equal to a designated first distance corresponding to the identified range exists among the one or more first distances, identify, based on identifying that the distance exists, whether a maximum value of values of the one or more first peaks is less than a designated first value, and determine a camera for obtaining the image among the multiple cameras 220, based on at least one of whether the distance exists or whether the maximum value of values of the one or more first peaks is less than the designated first value.

The at least one processor 250 may be configured to determine the camera, for obtaining the image, among the first camera and the second camera having a focal length shorter than a focal length of the first camera, based on the at least one of whether the distance exists or whether the maximum value of values of the one or more first peaks is less than the designated first value, the first camera and the second camera being included in the multiple cameras.

The at least one processor 250 may be configured to determine, based on the maximum value of values of the one or more first peaks being less than the designated first value, the first camera as the camera for obtaining the image among the first camera and the second camera.

The at least one processor 250 may be configured to identify, among the one or more first distances, one or more second distances corresponding one or more second peaks firstly obtained from each of the one or more first signals among the one or more first peaks, identify whether a distance, among the one or more second distances, less than a designated second distance shorter than the designated first distance exists, determine, based identifying that the distance less than the designated second distance does not exist, the first camera among the first camera and the second camera as the camera for obtaining the image, and identify, based identifying that the distance less than the designated second distance exists, whether a distance greater than or equal to the designated first distance corresponding to the identified range exists among the one or more first distances.

The at least one processor 250 may be configured to determine, based identifying that the distance does not exist, the second camera as a camera for obtaining the image among the first camera and the second camera.

The at least one processor 250 may be configured to identify, based identifying that the distance does not exist, whether the maximum value of values of the one or more first peaks is greater than or equal to a designated second value larger than the designated first value.

The at least one processor 250 may be configured to determine, based on the maximum value of values of the one or more first peaks being greater than or equal to the designated second value, the first camera as the camera for obtaining the image among the first camera and the second camera.

The at least one processor 250 may be configured to determine, based on the maximum value of values of the one or more first peaks being less than the designated second value, the second camera as a camera for obtaining the image among the first camera and the second camera.

The electronic device 101 may further include a flicker sensor 310, and the at least one processor 250 may be configured to determine, based on the maximum value of values of the one or more first peaks being greater than or equal to the designated second value and information obtained through the flicker sensor 310 satisfying a designated condition, the first camera as the camera for obtaining the image among the first camera and the second camera.

The electronic device 101 may further include an illuminance sensor, and the at least one processor may be configured to determine, based on the maximum value of values of the one or more first peaks being greater than or equal to the designated second value and information obtained through the flicker sensor 310 and/or the illuminance sensor satisfying a designated condition, the first camera as the camera for obtaining the image among the first camera and the second camera.

Figure 8:
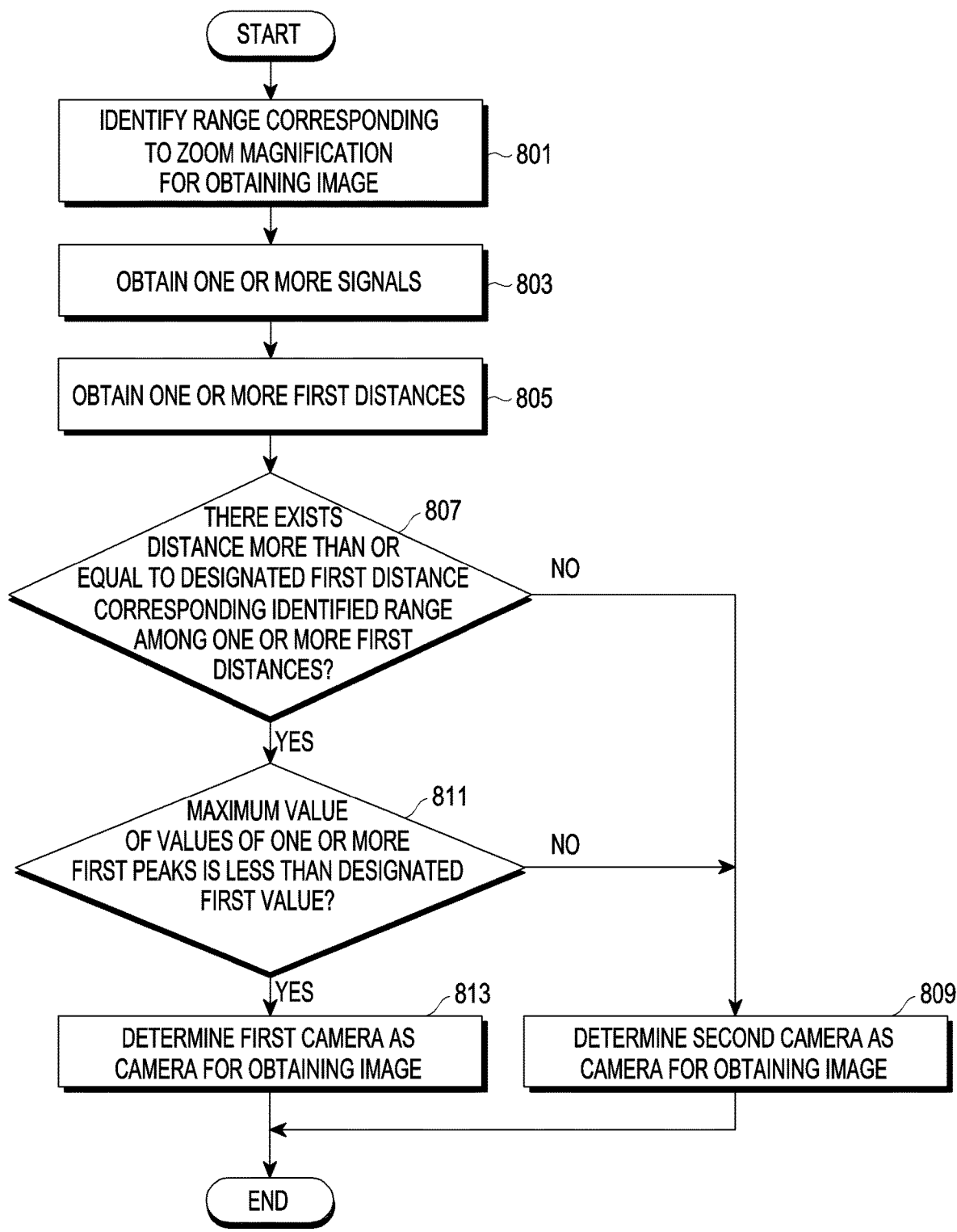
FIG. 8 is a flowchart illustrating a method for providing an image according to an embodiment.

FIG. 8 is a flowchart illustrating a method for providing an image according to an embodiment. For example, the method of FIG. 8 will be described below with reference to the electronic device 201 illustrated in FIG. 2.

Referring to FIG. 8, in operation 801, the processor 250 identifies, among multiple ranges related to a zoom magnification, a range corresponding to a zoom magnification for obtaining an image.

The processor 250 may determine, during execution of a camera application, a zoom magnification for obtaining an image. The processor 250 may determine, in response to an execution of a camera application, the zoom magnification (e.g., 10×) configured as a default as a zoom magnification for obtaining an image. The processor 250 may obtain, during execution of a camera application, a user input (e.g., a multi-touch pinch zoom in/out, pressing volume up/down key, etc.) for adjusting a zoom magnification. The processor 250 may determine the zoom magnification adjusted based on the obtained user input as a zoom magnification for obtaining an image. However, examples for determining a zoom magnification for obtaining an image are not limited to the examples described above. Hereinafter, the zoom magnification determined to obtain an image will be referred to as a "determined zoom magnification".

The processor 250 may identify, when the zoom magnification for obtaining an image is determined, among multiple ranges related to a zoom magnification, a range corresponding to the determined zoom magnification (i.e., a range within which the determined zoom magnification falls).

Each of the multiple ranges related to a zoom magnification may correspond to two cameras among multiple cameras (for example, multiple cameras disposed through the rear surface of the electronic device 201). Table 1 below depicts two cameras corresponding to each of multiple ranges related to a zoom magnification.

TABLE 1

| Multiple ranges related to zoom magnification | Two cameras | |
| --- | --- | --- |
| 0.5× (inclusive) to 3.0× (exclusive) | Camera 1(221) | Camera 2(222) |
| 3.0× (inclusive) to 10.0× (exclusive) | Camera 2(222) | Camera 3(223) |
| 10.0× (inclusive) to 15.0× (exclusive) | Camera 3(223) | Camera 4(224) |

As shown in Table 1, a first zoom magnification range (for example, 0.5× (inclusive) to 3.0× (exclusive) corresponds to camera 1 (221) (a super wide angle camera) and camera 2 (222) (a wide angel camera), a second zoom magnification range (for example, 3.0× (inclusive) to 10.0× (exclusive)) corresponds to camera 2 (222) and camera 3 (223) (a first telephoto camera), and a third zoom magnification range (for example, 10.0× (inclusive) to 15.0× (exclusive)) corresponds to camera 3 (223) and camera 4 (224) (a second telephoto camera).

One of the two cameras corresponding to a range among multiple ranges related to the zoom magnification (hereinafter, referred to as "multiple zoom magnification ranges"), within which the determined zoom magnification falls, may be determined to be a camera for obtaining an image. For example, when, among multiple zoom magnification ranges, the determined zoom magnification is 2.0×, the zoom magnification 2.0× may fall within a first zoom magnification range 0.5× (inclusive) to 3.0× (exclusive)). As the zoom magnification 2.0× falls within the first zoom magnification range (for example, 0.5× (inclusive) to 3.0× (exclusive)), one of camera 1 (221) and camera 2 (222) corresponding to the first zoom magnification range (for example, 0.5× (inclusive) to 3.0× (exclusive)) may be determined to be a camera for obtaining an image.

The processor 250 may identify, when among multiple zoom magnification ranges, the zoom magnification range within which the determined zoom magnification falls is identified, a designated first distance (hereinafter, referred to as a "designated first distance") corresponding to the identified zoom magnification range. For example, the processor 250 may identify the designated first distance required for determining a camera for obtaining an image among two cameras corresponding to the identified zoom magnification range.

One of two cameras corresponding the zoom magnification range may obtain an image with better quality compared with the other camera according to a distance between the distance sensor 230 and a subject. For example, among camera 1 (221) and camera 2 (222) corresponding to the first zoom magnification range (for example, 0.5× (inclusive) to 3.0× (exclusive)), when a distance between the distance sensor 230 and a subject is less than the designated first distance (e.g., about 28 (cm)), the quality of an image obtained through camera 1 (221) having a shorter focal length than camera 2 (222) may be better than that of an image obtained through camera 2 (222). For example, among camera 2 (222) and camera 3 (223) corresponding to the second zoom magnification range (for example, 3.0× (inclusive) to 10.0× (exclusive)), when a distance between the distance sensor 230 and a subject is less than the designated first distance (e.g., about 40 (cm)), the quality of an image obtained through camera 2 (222) having a shorter focal length than camera 3 (223) may be better than that of an image obtained through camera 3 (223). As another example, among camera 3 (223) and camera 4 (224) corresponding to the third zoom magnification range (for example, 10.0× (inclusive) to 15.0× (exclusive)), when a distance between the distance sensor 230 and a subject is less than the designated first distance (e.g., about 80 (cm)), the quality of an image obtained through camera 3 (223) having a shorter focal length than camera 4 (224) may be better than that of an image obtained through camera 4 (224).

The designated first distance may be a distance for determining a camera for obtaining an image having better quality among two cameras corresponding to the identified zoom magnification range.

The designated first distance may vary according to the identified zoom magnification range. For example, the designated first distance may be about 28 cm when the identified zoom magnification range pertains to the first zoom magnification range (for example, 0.5× (inclusive) to 3.0× (exclusive)), about 40 cm when the identified zoom magnification range pertains to the second zoom magnification range (for example, 3.0× (inclusive) to 10.0× (exclusive)), and about 80 cm when the identified zoom magnification range pertains to the third zoom magnification range (for example, 10.0× (inclusive) to 15.0× (exclusive)).

The designated first distance may be changed (or adjusted) according to a camera currently obtaining an image (e.g., a preview image) in consideration of hysteresis (i.e., a "hysteresis characteristic") of the camera.

In operation 803, the processor 250 obtains one or more signals corresponding to one or more regions included in the light-receiving part 233 of the distance sensor 230 based on light emitted from the light-emitting part 231 of the distance sensor 230 and then received by one or more regions of the light-receiving part 233 of the distance sensor 230.

The one or more regions among all of multiple regions included in the light-receiving part 233 of the distance sensor 230, may be set to two cameras corresponding to a zoom magnification range within which the determined zoom magnification falls. For example, when the zoom magnification range within which the determined zoom magnification falls is the first zoom magnification range (e.g., 0.5× (inclusive) to 3.0× (exclusive)), the one or more regions may be regions determined for the two cameras (for example, camera 1 (221) and camera 2 (222)) corresponding to the first zoom magnification rage (e.g., regions determined in consideration of an angle of view of camera 1 (221), an angle of view of camera 2 (222), and an angle of view of the distance sensor 230). However, the disclosure is not limited thereto, and the one or more regions may be configured to all of multiple regions of the light-receiving part 233 of the distance sensor 230.

The processor 250 may obtain signals by each of the one or more regions, based on the number of photons emitted from the light-emitting part 231 of the distance sensor 230 and then received by each of the one or more regions. For example, the processor 250, as described with reference to FIG. 6, may obtain a signal such as the first signal 611 or the second signal 621 by each of the one or more regions.

In operation 805, the processor 250 may obtain, based on one or more first peaks of the one or more signals, one or more first distances.

The processor 250 may obtain at least one peak from each of the one or more signals obtained through operation 803. For example, as described with reference to FIG. 6, the processor 250 may obtain, when the first signal 611 is obtained, a peak 612 from the first signal 611. The processor 250 may obtain, when the second signal 621 is obtained, a peak 622 and a peak 623 from the second signal 621. The one or more first peaks may include peaks obtained from all the signals obtained by the one or more regions.

The processor 250 may obtain, based on the one or more first peaks of the one or more signals, one or more first distances. For example, the processor 250 may obtain, based on a time at which the one or more first peaks are obtained, one or more first distances corresponding to the one or more first peaks.

The processor 250 may obtain values of the one or more first peaks of the one or more signals. The values of the one or more first peaks may be values representing the number of photons (e.g., m1, m2, and m3 in FIG. 6) corresponding to each of the one or more first peaks.

The processor 250 may obtain one or more second peaks of the one or more signals. For example, among the one or more first peaks of the one or more signals, one or more second peaks firstly (fastest in time) obtained from each of the one or more signals obtained by one or more regions among the multiple regions included in the light-receiving part 233 may be obtained.

The processor 250 may obtain, based on the one or more second peaks, one or more second distances. For example, the processor 250 may obtain, based on a time at which the one or more second peaks are obtained, one or more second distances corresponding to the one or more second peaks.

Although FIG. 8 illustrates operation 803 and operation 805 being performed sequentially after operation 801, the method is not limited thereto. For example, operation 801 may be performed after operation 803 and operation 805 are performed or while operation 803 and operation 805 are being performed.

In operation 807, the processor 250 identifies whether there is a distance that is greater than or equal to a designated first distance corresponding to the identified range among the one or more first distances. For example, the processor 250 may identify whether there exists a distance, among the one or more first distances obtained through operation 805, which is greater than or equal to a designated first distance corresponding to the identified zoom magnification range identified through operation 801. As another example, the processor 250 may identify whether a maximum distance of the one or more first distances obtained through operation 805 is greater than or equal to the designated first distance corresponding to the identified zoom magnification range identified through operation 801.

The designated first distance corresponding to the identified range among the one or more first distances may be about 28 cm when the determined zoom magnification range falls within the first zoom magnification range (e.g., 0.5× (inclusive) to 3.0× (exclusive)), about 40 cm when that the determined zoom magnification range falls within the second zoom magnification range (e.g., 3.0× (inclusive) to 10.0× (exclusive)), and about 80 cm when the determined zoom magnification range falls within the third zoom magnification range (e.g., 10.0× (inclusive) to 15.0× (exclusive)).

When there is no distance, among the one or more first distances, which is greater than or equal to the designated first distance corresponding to the identified range in operation 807, the processor 250 determines the second camera as a camera for obtaining an image among the multiple cameras in operation 809. The processor 250 may determine, when there is no distance, among the one or more first distances, greater than or equal to the designated first distance corresponding to the identified range, a camera having a shorter focal length than that of the other camera (e.g., camera 1 (221), camera 2 (222), or camera 3 (223) from each of zoom magnification ranges in Table 1) as a camera for obtaining an image among the two cameras corresponding to the identified range.

There may be no distance, among the one or more first distances, which is greater than or equal to the designated first distance corresponding to the identified range, when the subject exists within the designated first distance from the distance sensor 230. For example, there may be no distance, among the one or more first distances, which is greater than or equal to the designated first distance corresponding to the identified range, when the subject is only located within the designated first distance from the distance sensor 230 or the subject is located within the designated first distance from the distance sensor 230 but the distance sensor 230 is partially blocked by an obstacle.

When there is a distance, among the one or more first distances, which is greater than or equal to the designated first distance corresponding to the identified range in operation 807, the processor 250 identifies whether a maximum value of the one or more first peaks is less than the designated first value in operation 811.

The designated first value may be configured to distinguish when the distance sensor 230 is partially blocked by an obstacle from when the subject is located within the designated second distance from the distance sensor 230 (e.g., about 5 (cm)). When the distance sensor 230 is partially blocked by an obstacle, a maximum value of the one or more first peaks may be less than about 10,000, like a maximum value (e.g., about 2,576 (722-2)) of values of the second peaks of table 722 in FIG. 7B. When the subject is located within a designated second distance from the distance sensor 230 (e.g., about 5 (cm)), a maximum value of the one or more first peaks may be greater than or equal to about 10,000, like a maximum value of values of the second peaks (e.g., about 262,703 (742-2)) of table 742 in FIG. 7D. The processor 250 may configure the designated first value, e.g., about 10,000, to distinguish when the distance sensor 230 is partially blocked by an obstacle from when the subject exists within the designated second distance from the distance sensor 230 (e.g., about 5 (cm)).

When a maximum value of the one or more first peaks is less than the designated first value in operation 811, the processor 250 determines the first camera as a camera for obtaining an image among the multiple cameras in operation 813. The processor 250 may determine, when a maximum value of the one or more first peaks is less than the designated first value, a camera having a longer focal length than that of the other camera (e.g., camera 2 (222), camera 3 (223), or camera 4 (224) from each of zoom magnification ranges in Table 1) among the two cameras corresponding to the identified range (e.g., a zoom magnification range within which the determined zoom magnification falls) as a camera for obtaining an image.

In A maximum value of values of the one or more first peaks may be less than the designated first value when the subject is located beyond the designated first distance from the distance sensor 230 (e.g., the subject is not located within the designated first distance from the distance sensor 230) or when the subject is located within the designated first distance from the distance sensor 230 but the distance sensor 230 is partially blocked by an obstacle.

When a maximum value of the one or more first peaks is not less than the designated first value in operation 811 the processor 250 determines the second camera as a camera for obtaining an image among the multiple cameras in operation 809.

A maximum value of the one or more first peaks may not be less than the designated first value when the subject is located within the designated second distance from the distance sensor 230 (e.g., about 5 (cm)) in addition to the subject being located at a distance greater than or equal to the designated first distance from the distance sensor 230.

The processor 250 may obtain an image through the determined camera.

Figure 9:
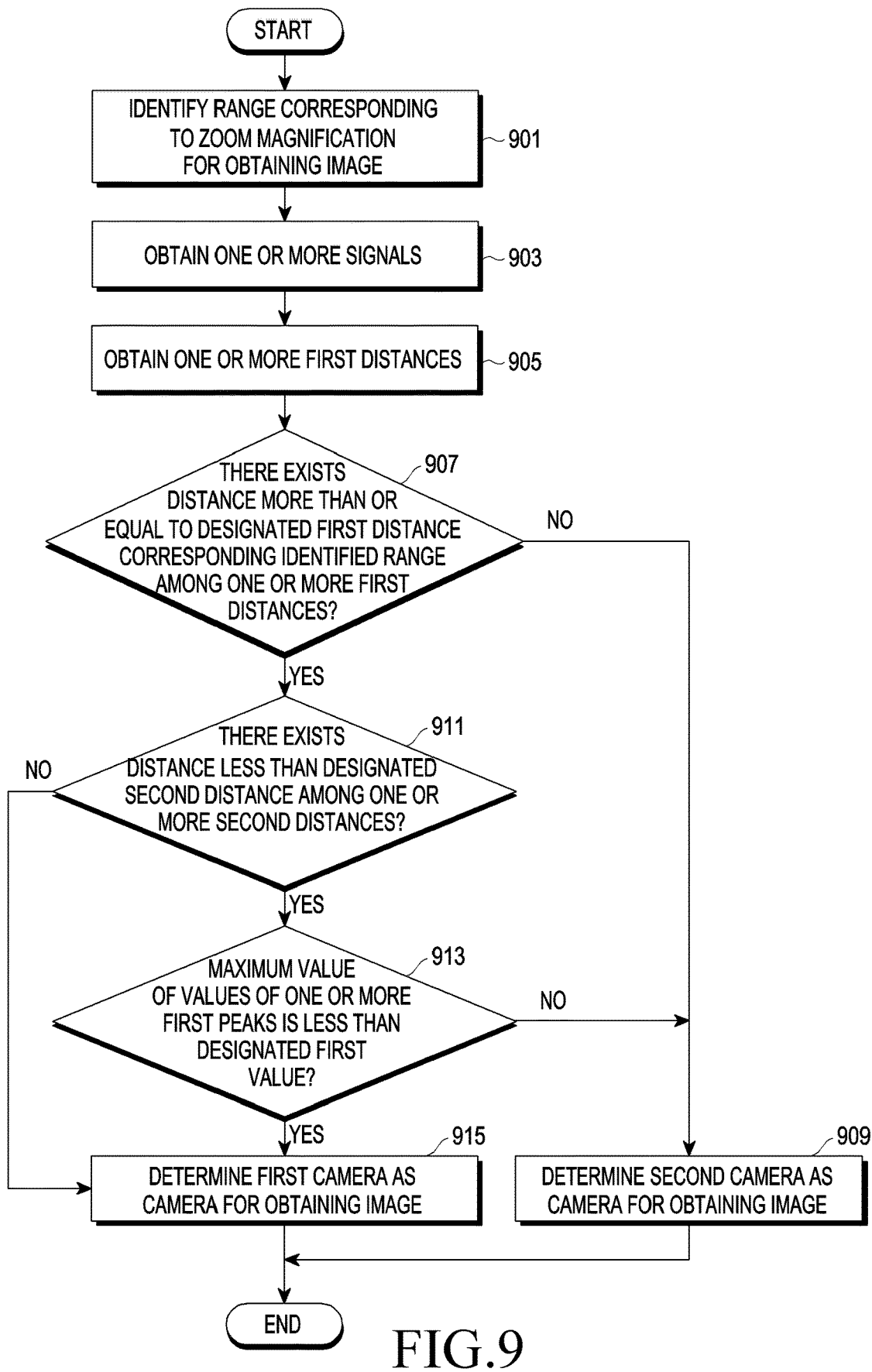
FIG. 9 is a flowchart illustrating a method for providing an image according to an embodiment.

FIG. 9 is a flowchart illustrating a method for providing an image according to an embodiment. For example, the method of FIG. 9 will be described below with reference to the electronic device 201 illustrated in FIG. 2.

Referring to FIG. 9, in operation 901, the processor 250 identifies, among multiple ranges related to a zoom magnification, a range corresponding to a zoom magnification for obtaining an image.

In operation 903, the processor 250 obtains one or more signals corresponding to one or more regions included in the light-receiving part 233 of the distance sensor 230 based on light emitted from the light-emitting part 231 of the distance sensor 230 and then received by one or more regions of the light-receiving part 233 of the distance sensor 230.

In operation 905, the processor 250 obtains one or more first distances, based on one or more first peaks of the one or more signals.

In operation 907, the processor 250 identifies whether there is a distance that is greater than or equal to a designated first distance corresponding to the identified range among the one or more first distances.

Operation 901 to operation 907 are at least partially identical or similar to operation 801 to operation 807 in FIG. 8, respectively, and thus the detailed description will be omitted.

In operation 911, the processor 250 identifies whether there is a distance that less than a designated second distance among the one or more second distances.

When the distance sensor 230 is partially blocked by an obstacle, a maximum value of values of the one or more first peaks may be smaller than the designated first value (e.g., about 10,000), like a maximum value (e.g., about 2,576 (722-2)) of values of the second peaks of table 722 in FIG. 7B. When the subject is located within a designated second distance from the distance sensor 230 (e.g., about 5 (cm)), a maximum value of the one or more first peaks may be greater than or equal to the designated first value (e.g., about 10,000) like a maximum value (e.g., about 262,703 (742-2)) of the second peaks of table 742 in FIG. 7D.

When there is no distance less than the designated second distance among the one or more second distances in operation 911, the processor 250 determines the first camera as a camera for obtaining an image among the multiple cameras in operation 915.

When there is a distance that is less than the designated second distance among the one or more second distances in operation 911, the processor 250 identifies whether a maximum value of values of the one or more first peaks is less than the designated first value in operation 913.

When a maximum value of the one or more first peaks is less than the designated first value in operation 913, the processor 250 determines the first camera cameras as a camera for obtaining an image among the multiple in operation 915.

When a maximum value of the one or more first peaks is not less than the designated first value in operation 913, the processor 250 determines the second camera as a camera for obtaining an image among the multiple cameras in operation 909.

Operation 913, operation 915, and operation 909 are at least partially identical or similar to operation 811, operation 813, and operation 809 in FIG. 8, respectively, and thus the detailed description will be omitted.

Figure 10:
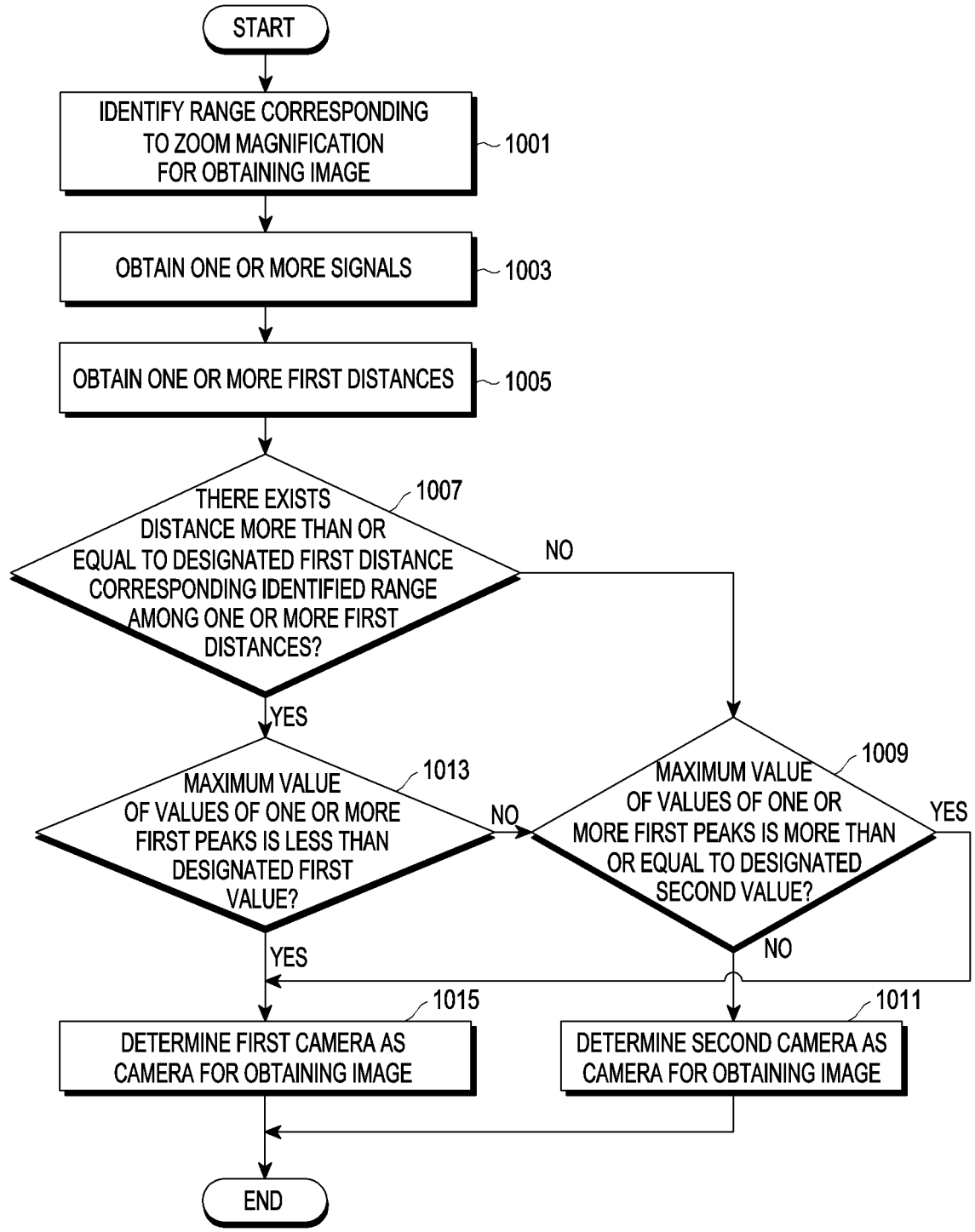
FIG. 10 is a flowchart illustrating a method for providing an image while a distance sensor is entirely blocked by an obstacle according to an embodiment.

FIG. 10 is a flowchart illustrating a method for providing an image while a distance sensor is entirely blocked by an obstacle according to an embodiment. For example, the method of FIG. 10 will be described below with reference to the electronic device 201 illustrated in FIG. 2.

Referring to FIG. 10, in operation 1001, the processor 250 identifies, among multiple ranges related to a zoom magnification, a range corresponding to a zoom magnification for obtaining an image.

In operation 1003, the processor 250 obtains one or more signals corresponding to one or more regions included in the light-receiving part 233 of the distance sensor 230 based on light emitted from the light-emitting part 231 of the distance sensor 230 and then received by the one or more regions of the light-receiving part 233 of the distance sensor 230.

In operation 1005, the processor 250 obtains one or more first distances, based on the one or more first peaks of the one or more signals.

In operation 1007, the processor 250 identifies whether there is a distance that is greater than or equal to the designated first distance corresponding to the identified range among the one or more first distances.

Operation 1001 to operation 1007 are at least partially identical or similar to operation 801 to operation 807 in FIG. 8, respectively, and thus the detailed description will be omitted.

When there is no distance, among the one or more first distances, which is greater than or equal to the designated first distance corresponding to the identified range in operation 1007, the processor 250 identifies whether a maximum value of the one or more first peaks is greater than or equal to the designated second value in operation 1009.

The designated second value may be configured to distinguish when the distance sensor 230 is entirely blocked by an obstacle from when the subject exists within the designated second distance (for example, about 5 (cm)) from the distance sensor 230. When the distance sensor 230 is entirely blocked by an obstacle (for example, the distance sensor 230 is entirely covered by a finger), as illustrated in FIG. 7C, a maximum value of values of the one or more first peaks (for example, values of one or more second peaks) may be greater than or equal to about 290,000 (e.g., 292,337 (732-2)).

As another example, when the subject is located within the designated second distance (for example, about 5 (mm)) from the distance sensor 230, as illustrated in FIG. 7D, a maximum value of values of the one or more first peaks (for example, values of one or more second peaks) may be less than about 290,000 (e.g., 262703 (742-2)). The designated second value may be configured to be a value (e.g., about 290,000) so as to distinguish the case that the distance sensor 230 is entirely blocked by an obstacle from the case that the subject exists within the designated second distance (for example, about 5 (cm)) from the distance sensor 230.

When in operation 1009, a maximum value of the one or more first peaks may be greater than or equal to the designated second value in operation 1009, the processor 250 determines the first camera (e.g., camera 2 (222), camera 3 (223), or camera 4 (224) in Table 1) having a longer focal length as a camera for obtaining an image among the multiple cameras (for example, the first camera and the second camera) in operation 1015.

A maximum value of the one or more first peaks may be greater than or equal to the designated second value when the distance sensor 230 is entirely blocked by an obstacle. When the distance sensor 230 is entirely blocked by an obstacle, the light-receiving part 233 of the distance sensor 230 receives only the light reflected by the obstacle, and cannot identify an actual distance between the distance sensor 230 and the subject. That is, when the distance sensor 230 is entirely blocked by an obstacle, the processor 250 may not identify whether the actual distance between the distance sensor 230 and the subject is greater than or equal to the designated first distance.

When the actual distance between the distance sensor 230 and the subject is not identified, the processor 250 may determine the first camera having a longer focal length than that of the second camera as a camera for obtaining an image among the first camera and the second camera. For example, an image obtained by photographing the subject beyond the designated first distance from the distance sensor 230 by using the second camera may have better quality than an image obtained by photographing the subject within the designated first distance from the distance sensor 230 by using the first camera. In addition, a frequency of photographing a subject beyond the designated first distance with a camera by a user may be higher than a frequency of photographing a subject within the designated first distance with a camera by a user Considering the examples described above, the processor 250 may determine, when a maximum value of values of the one or more first peaks is greater than or equal to the designated second value (e.g., the distance sensor 230 is entirely blocked by an obstacle), the first camera as a camera for obtaining an image among the first camera and the second.

When in operation 1009, a maximum value of the one or more first peaks is less than to the designated second value (e.g., when the subject is located within the designated second distance from the distance sensor 230) in operation 1011, the processor 250 determines the second camera (e.g., camera 1 (221), camera 2 (222), or camera 3 (223) from each zoom magnification in Table 1) having a shorter focal length as a camera for obtaining an image among the multiple cameras in operation 1011.

When there is a distance, among the one or more first distances, which is greater than or equal to the designated first distance corresponding to the identified range in operation 1007, the processor 250 identifies whether a maximum value of values of the one or more first peaks is less than the designated first value in operation 1013.

Operation 1013 is at least partially identical or similar to operation 811 in FIG. 8, and thus the detailed description will be omitted.

When a maximum value of the one or more first peaks is not less than the designated first value in operation 1013, the processor 250 identifies whether a maximum value of the one or more first peaks is greater than or equal to the designated second value in operation 1009.

When a maximum value of the one or more first peaks is less than the designated first value in operation 1013, the processor 250 determines the first camera as a camera for obtaining an image among the multiple cameras in operation 1015.

The processor 250 may determine whether the distance sensor 230 is entirely blocked by an obstacle further considering information obtained by the flicker sensor 310 and/or the illuminance sensor (e.g., further considering whether information obtained by the flicker sensor 310 and/or the illuminance sensor satisfies a designated condition). When a maximum value of the one or more first peaks is greater than or equal to the designated second value and the value (e.g., the value representing a strength of the light incident to the flicker sensor 310) obtained by the flicker sensor 310 is less than or equal to a designated value (e.g., about 0), the processor 250 may determine the distance sensor 230 as being entirely blocked by an obstacle.

As another example, when a maximum value of the one or more first peaks is greater than or equal to the designated second value and the rate of light incident to the flicker sensor 310 (e.g., relative to total strength of the light, the strength rate of light emitted from the light-emitting part 231 of the distance sensor 230 and then incident to the flicker sensor 310) is greater than or equal to a designated rate, the processor 250 may determine the distance sensor 230 as being entirely blocked by an obstacle.

As another example, when a maximum value of the one or more first peaks is greater than or equal to the designated second value and the frequency (e.g., a frequency at which an artificial light source around the electronic device 101 may emit light) detected by the flicker sensor 310 is changed or irregular, the processor 250 may determine the distance sensor 230 as being entirely blocked by an obstacle.

As another example, when a maximum value of the one or more first peaks is greater than or equal to the designated second value, the information obtained by the flicker sensor 310 satisfies the designated condition (e.g., when the value obtained by the flicker sensor 310 is less than or equal to the designated value, the rate of light incident to the flicker sensor 310 is greater than or equal to the designated rate, or the frequency detected by the flicker sensor 310 is changed and irregular), and the information obtained by the illuminance sensor satisfies the designated condition (e.g., when the value obtained by the illuminance sensor (e.g., the value represent the strength of light incident to the illuminance sensor) is greater than or equal to the designated value), the processor 250 may determine the distance sensor 230 as being entirely blocked by an obstacle.

When a maximum value of the one or more first peaks is greater than or equal to the designated second value and the information obtained by the flicker sensor 310 and/or the illuminance sensor satisfies the designated condition, the processor 250 may determine the first camera as a camera for obtaining an image among the multiple cameras. When a maximum value of the one or more first peaks is less than the designated second value and the information obtained by the flicker sensor 310 and/or the illuminance sensor does not satisfy the designated condition, the processor 250 may determine the second camera as a camera for obtaining an image among the multiple cameras.

Figure 11:
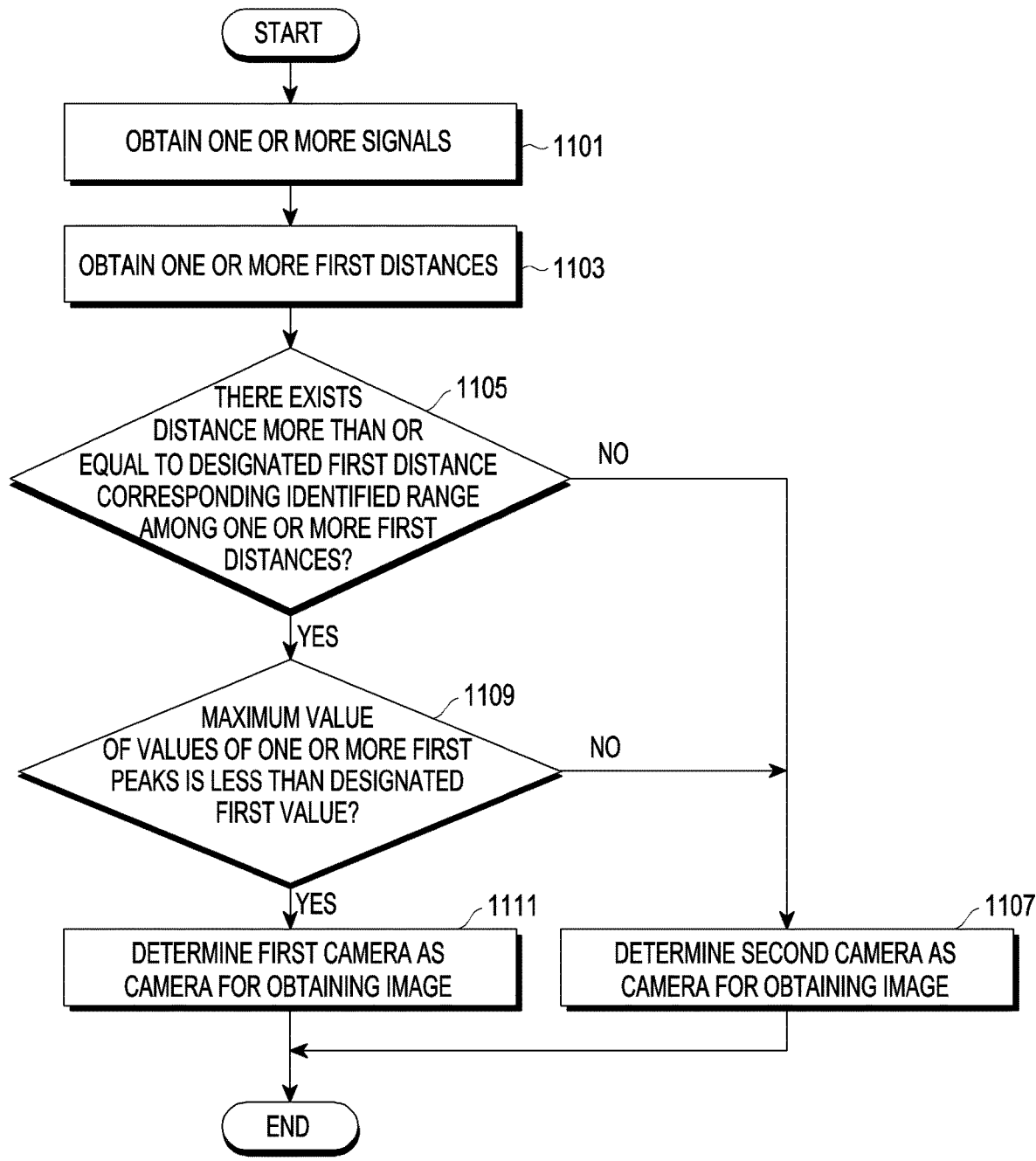
FIG. 11 is a flowchart illustrating a method for providing an image considering hysteresis of a camera according to an embodiment.

FIG. 11 is a flowchart 1100 illustrating a method for providing an image considering hysteresis of a camera according to an embodiment. For example, the method of FIG. 11 will be described below with reference to the electronic device 201 illustrated in FIG. 2.

The method of FIG. 11 may be performed while obtaining an image by the second camera after the second camera is determined to be the camera for obtaining an image among the multiple cameras.

Referring to FIG. 11, in operation 1101, the processor 250 obtains one or more signals through the distance sensor 230 while obtaining an image (e.g., a preview image) through the second camera.

In operation 1103, the processor 250 obtains, based on the one or more first peaks of the one or more signals, one or more first distances.

Operation 1103 is at least partially identical or similar to operation 805, thus the detailed description will be omitted.

In operation 1105, the processor 250 identifies whether there is a distance that is greater than or equal to a designated third distance among the one or more first distances, corresponding to the identified range.

The designated third distance may be configured to be a longer distance than the designated first distance. For example, when a zoom magnification for obtaining an image is identified to fall within the first zoom magnification range (e.g., 0.5× (inclusive) to 3.0× (exclusive)) in operation 801 in FIG. 8, the designated third distance may be configured to a longer distance (e.g., 30 (cm)) than the designated first distance (e.g., 28 (cm)) corresponding to the first zoom magnification range.

As another example, when a zoom magnification for obtaining an image is identified to fall within the second zoom magnification range (e.g., 3.0× (inclusive) to 10.0× (exclusive)) in operation 801 in FIG. 8, the designated third distance may be configured to a longer distance (e.g., 50 (cm)) than the designated first distance (e.g., 40 (cm)) corresponding to the second zoom magnification range.

As yet another example, when a zoom magnification for obtaining an image is identified to fall within the third zoom magnification range (e.g., 10.0× (inclusive) to 15.0× (exclusive)) in operation 801 in FIG. 8, the designated third distance may be configured to a longer distance (e.g., 100 (cm)) than the designated first distance (e.g., 80 (cm)) corresponding to the third zoom magnification range.

When there is no distance, among the one or more first distances, which is greater than or equal to the designated third distance corresponding to the identified range in operation 1105, the processor 250 determines the second camera as a camera for obtaining an image among the multiple cameras in operation 1107. For example, when there is no distance that is greater than or equal to the third distance among the one or more first distances, the processor 250 may determine to maintain the operation for obtaining an image through the second camera currently obtaining an image.

When there is a distance, among the one or more first distances, which is greater than or equal to the designated third distance corresponding to the identified range in operation 1105, the processor 250 identifies whether a maximum value of the one or more first peaks is less than the designated first value in operation 1109.

Operation 1109 is at least partially identical or similar to operation 811 in FIG. 8, and thus the detailed description will be omitted.

When a maximum value of the one or more first peaks is not less than the designated first value in operation 1109, the processor 250 determines the second camera as a camera for obtaining an image among the multiple cameras in operation 1107.

When a maximum value of the one or more first peaks is less than the designated first value in operation 1109, the processor 250 determines the first camera as a camera for obtaining an image among the multiple cameras in operation 1111. For example, the processor 250 may switch a camera for obtaining an image from the second camera to the first camera.

When the first camera among the multiple cameras is determined to be a camera for obtaining an image in each of FIG. 8 to FIG. 10, considering hysteresis of a camera, the designated first distance may be used as a substitute for the designated third distance described in operation 1105 in FIG. 11.

Figure 12:
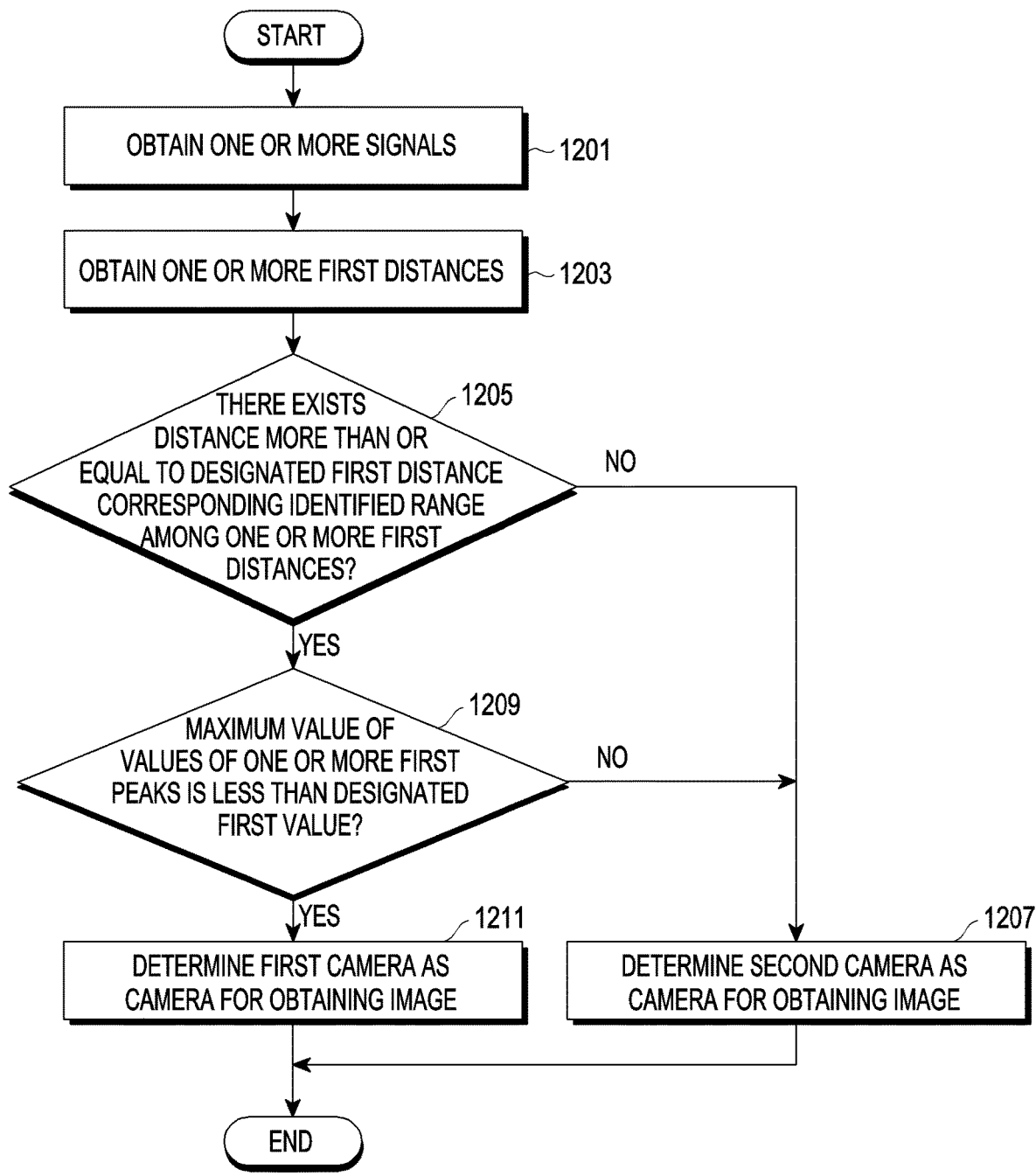
FIG. 12 is a flowchart illustrating a method for providing an image according to an embodiment.

FIG. 12 is a flowchart illustrating a method for providing an image according to an embodiment. Specifically, the method in FIG. 12 may be used to determine a camera for obtaining an image, among the multiple cameras without considering a zoom magnification for obtaining an image. For example, the method of FIG. 12 will be described below with reference to the electronic device 201 illustrated in FIG. 2.

Referring to FIG. 12, in operation 1201, the processor 250 obtains one or more signals corresponding to one or more regions included in the light-receiving part 233 of the distance sensor 230 based on light emitted from the light-emitting part 231 of the distance sensor 230 and then received by the one or more regions of the light-receiving part 233 of the distance sensor 230.

In operation 1203, the processor 250 obtains one or more first distances, based on the one or more first peaks of the one or more signals.

Operation 1201 and operation 1203 are at least partially identical or similar to operation 803 and operation 805 in FIG. 8, respectively, and thus the detailed description will be omitted.

In operation 1205, the processor 250 identifies whether there is a distance that is greater than or equal to a designated fourth distance among the one or more first distances.

When the electronic device 201 includes two rear surface cameras, the designated fourth distance may be configured to determine a camera capable of obtaining an image having better quality, among the two cameras. For example, the designated fourth distance may be configured by considering focal lengths of the two cameras included in the electronic device 201.

When there is no distance that is greater than or equal to the designated fourth distance among the one or more first distances in operation 1205, the processor 250 determines the second camera as a camera for obtaining an image among the two cameras in operation 1207. For example, when there is no distance, among the one or more first distances, which is greater than or equal to the designated fourth distance corresponding to the identified range, the processor 250 may determine, as a camera for obtaining an image, the second camera having a shorter focal length among the first camera and the second camera.

When there is a distance that is greater than or equal to the designated fourth distance among the one or more first distances in operation 1205, the processor 250 identifies whether a maximum value of the one or more first peaks is less than the designated first value in operation 1209.

Operation 1209 is at least partially identical or similar to operation 811 in FIG. 8, and thus the detailed description will be omitted.

When a maximum value of the one or more first peaks is less than the designated first value in operation 1209, the processor 250 determines the first camera as a camera for obtaining an image among the multiple cameras in operation 1211. For example, when a maximum value of the one or more first peaks is less than the designated first value, the processor 250 may determine, as a camera for obtaining an image, the first camera having a longer focal length among the first camera and the second camera included When a maximum value of the one or more first peaks is not less than the designated first value in operation 1209, the processor 250 determines the second camera as a camera for obtaining an image among the multiple cameras in operation 1207.

When determining a camera for obtaining an image, among the multiple cameras, without considering a zoom magnification for obtaining an image, the description above with reference to FIGS. 9 to 11 may be identically or similarly applied thereto.

According to an embodiment, method for providing an image by an electronic device 101 may include identifying a range corresponding to a zoom magnification for obtaining an image, among multiple ranges related to a zoom magnification, obtaining one or more signals corresponding to the one or more regions, based on light emitted from the light-emitting part 231 of the distance sensor 230 of the electronic device 101 and received by one or more regions of the light-receiving part 233 of the distance sensor 230, obtaining one or more first distances, based on one or more first peaks of the one or more signals, identifying whether a distance greater than or equal to a designated first distance corresponding to the identified range exists among the one or more first distances, identifying, based on identifying that the distance exists, whether a maximum value of the one or more first peaks is less than a designated first value, and determining a camera for obtaining the image among the multiple cameras included in the electronic device, based on at least one of whether the distance exists or whether the maximum value of the one or more first peaks is less than the designated first value.

Determining the camera for obtaining the image may include determining the camera for obtaining the image among the first camera and the second camera having a focal length shorter than focal length of the first camera included in the multiple cameras 220, based on the at least one of whether the distance exists or whether the maximum value of the one or more first peaks is less than the designated first value, the first camera and the second camera being included in the multiple cameras.

Determining the camera for obtaining the image may include determining, based on the maximum value of the one or more first peaks being less than the designated first value, the first camera as a camera for obtaining the image among the first camera and the second camera.

The method may further include identifying, among the one or more first distances, one or more second distances corresponding one or more second peaks firstly obtained from each of the one or more first signals among the one or more first peaks, identifying whether a distance less than a designated second distance shorter than the designated first distance exists among the one or more second distances, determining, based identifying that the distance less than to the designated second distance does not exist, the first camera as the camera for obtaining the image among the first camera and the second camera, and identifying, based identifying that the distance less than the second distance exists, whether a distance that is greater than or equal to the designated first distance corresponding to the identified range exists among the one or more first distances.

Determining the camera for obtaining the image may include determining, based identifying that the distance does not exist, the second camera as the camera for obtaining the image among the first camera and the second camera.

Determining the camera for obtaining the image may further include identifying, based identifying that the distance does not exist, whether the maximum value of the one or more first peaks is greater than or equal to the designated second value larger than the designated first value.

Determining the camera for obtaining the image may include determining the first camera as a camera for obtaining the image among the first camera and the second camera based on the maximum value of the one or more first peaks being greater than or equal to the designated second value.

Determining the camera for obtaining the image may include determining the second camera as the camera for obtaining the image among the first camera and the second camera based on the maximum value of the one or more first peaks being less the designated second value.

Determining the camera for obtaining the image may include determining the first as a camera for obtaining the image camera among the first camera and the second camera based on the maximum value of the one or more first peaks being greater than or equal to the designated second value and information obtained by the flicker sensor satisfying the designated condition.

Determining the camera for obtaining the image may include determining the first camera among the first camera and the second camera as the camera for obtaining the image based on a maximum value of the one or more first peaks being greater than or equal to the designated second value and information obtained by the flicker sensor 310 and/or the illuminance sensor satisfying the designated condition.

In addition, a structure of data used in an embodiment of the disclosure may be recorded in a non-transitory computer-readable recording medium through various processes. The computer-readable recording medium may include recording media such as magnetic recording media (e.g., ROM, a floppy disk, a hard disk, etc.) and optical reading media (e.g., CD-ROM, a digital versatile disc (DVD), etc.).

In accordance with the above-described embodiments, a method for providing images and an electronic device supporting the same are provided, which are advantageous in that, even when a range sensor is affected by foreign materials or the user, an optimal camera can still be selected from the multiple cameras included in the electronic device by using a signal obtained through the range sensor. Accordingly, the electronic device can obtain images having improved quality.

While the disclosure has been particularly shown and described with reference to exemplary embodiments thereof, it will be understood by those skilled in the art that various changes in form and details may be made therein without departing from the spirit and scope of the disclosure as defined by the appended claims and their equivalents.

What is claimed is:
1. An electronic device, comprising:
multiple cameras;
a distance sensor including a light-emitting part and a light-receiving part; and
at least one processor,
wherein the at least one processor is configured to:
identify a range corresponding to a zoom magnification for obtaining an image,
obtain, based on light emitted from the light-emitting part and received by one or more regions of the light-receiving part, one or more signals corresponding to the one or more regions of the light-receiving part,
identify one or more first peaks of the one or more signals,
obtain, based on the one or more first peaks, one or more first distances,
identify whether a distance that is greater than or equal to a first distance corresponding to the identified range exists among the one or more first distances,
identify, based on identifying that the distance that is greater than or equal to the first distance exists, whether a maximum value of the one or more first peaks is less than a first value, and
determine a camera for obtaining the image among the multiple cameras, based on at least one of whether the distance that is greater than or equal to the first distance exists or whether the maximum value of the one or more first peaks is less than the first value.

2. The electronic device of claim 1, wherein the multiple cameras include a first camera and a second camera having a second focal length that is shorter than a first focal length of the first camera, and wherein the processor is further configured to determine the camera for obtaining the image among the first camera and the second camera, based on the at least one of whether the distance that is greater than or equal to the first distance exists or whether the maximum value of the one or more first peaks is less than the first value.

3. The electronic device of claim 2, wherein the at least one processor is further configured to determine, based on the maximum value of the one or more first peaks being less than the first value, the first camera as the camera for obtaining the image among the first camera and the second camera.

4. The electronic device of claim 3, wherein the at least one processor is further configured to:
identify, among the one or more first distances, one or more second distances corresponding one or more second peaks first obtained from each of the one or more first signals, among the one or more first peaks,
identify whether a distance less than a second distance, which is less than the first distance, exists among the one or more second distances,
determine, based identifying that the distance, which is less than the second distance, does not exist, the first camera as the camera for obtaining the image among the first camera and the second camera, and
identify, based identifying that the distance, which is less than the second distance exists, whether a distance that is greater than or equal to the first distance corresponding to the identified range exists among the one or more first distances.

5. The electronic device of claim 3, wherein the at least one processor is further configured to determine, based identifying that the distance that is greater than or equal to the first distance does not exist, the second camera as the camera for obtaining the image among the first camera and the second camera.

6. The electronic device of claim 2, wherein the at least one processor is further configured to identify, based identifying that the distance that is greater than or equal to the first distance does not exist, whether the maximum value of the one or more first peaks is greater than or equal to a second value, which is greater than the first value.

7. The electronic device of claim 6, wherein the at least one processor is further configured to determine, based on the maximum value of the one or more first peaks being greater than or equal to the second value, the first camera as the camera for obtaining the image among the first camera and the second camera.

8. The electronic device of claim 7, wherein the at least one processor is further configured to determine, based on the maximum value of the one or more first peaks being less than the second value, the second camera as the camera for obtaining the image among the first camera and the second camera.

9. The electronic device of claim 6, further comprising a flicker sensor,
wherein the at least one processor is further configured to determine, based on the maximum value of the one or more first peaks being greater than or equal to the second value and information obtained through the flicker sensor satisfying a designated condition, the first camera as the camera for obtaining the image among the first camera and the second camera.

10. The electronic device of claim 9, further comprising an illuminance sensor,
wherein the at least one processor is further configured to determine, based on the maximum value of the one or more first peaks being greater than or equal to the second value and at least one of the information obtained through the flicker sensor or information obtained through the illuminance sensor satisfying the designated condition, the first camera as the camera for obtaining the image among the first camera and the second camera.

11. A method performed by an electronic device, the method comprising:
identifying a range corresponding to a zoom magnification for obtaining an image;
obtaining, based on light emitted from a light-emitting part of a distance sensor of the electronic device and received by one or more regions of a light-receiving part of the distance sensor, one or more signals corresponding to the one or more regions of the light-receiving part;
identifying one or more first peaks of the one or more signals;
obtaining one or more first distances, based on the one or more first peaks;
identifying whether a distance that is greater than or equal to a first distance corresponding to the identified range exists among the one or more first distances;
identifying, based on identifying that the distance that is greater than or equal to the first distance exists, whether a maximum value of the one or more first peaks is less than a first value; and
determining a camera for obtaining the image among multiple cameras included in the electronic device, based on at least one of whether the distance that is greater than or equal to the first distance exists or whether the maximum value of the one or more first peaks is less than the designated first value.

12. The method of claim 11, wherein the multiple cameras include a first camera and a second camera having a second focal length that is shorter than a first focal length of the first camera, and
wherein determining the camera for obtaining the image comprises:
determining the camera for obtaining the image among the first camera and the second camera, based on at least one of whether the distance that is greater than or equal to the first distance exists or whether the maximum value of the one or more first peaks is less than the first value.

13. The method of claim 12, wherein determining the camera for obtaining the image further comprises:
    determining, based on the maximum value of the one or more first peaks being less than the first value, the first camera as the camera for obtaining the image among the first camera and the second camera.

14. The method of claim 13, further comprising:
    identifying, among the one or more first distances, one or more second distances corresponding one or more second peaks first obtained from each of the one or more first signals, among the one or more first peaks,
    identifying whether a distance that is less than a second distance, which is less than the first distance, exists among the one or more second distances,
    determining the first camera as the camera for obtaining the image among the first camera and the second camera, based identifying that the distance that is less than the second distance does not exist, and
    identifying, based identifying that the distance that is less than the second distance exists, whether the distance that is greater than or equal to the first distance corresponding to the identified range exists among the one or more first distances.

15. The method of claim 13, wherein determining the camera for obtaining the image further comprises determining the second camera as the camera for obtaining the image among the first camera and the second camera based identifying that the distance that is greater than or equal to the first distance does not exist.

16. The method of claim 12, wherein determining the camera for obtaining the image further comprises identifying, based identifying that the distance that is greater than or equal to the first distance does not exist, whether the maximum value of the one or more first peaks is greater than or equal to a second value, which is greater than the first value.

17. The method of claim 16, wherein determining the camera for obtaining the image further comprises determining, based the maximum value of the one or more first peaks being greater than or equal to the second value, the first camera as the camera for obtaining the image among the first camera and the second camera.

18. The method of claim 17, wherein determining the camera for obtaining the image further comprises determining, based on the maximum value of the one or more first peaks being less than the second value, the second camera as the camera for obtaining the image among the first camera and the second camera.

19. The method of claim 11, wherein determining the camera for obtaining the image further comprises:
    determining the first camera as the camera for obtaining the image among the first camera and the second camera, based on the maximum value of the one or more first peaks being greater than or equal to the second value and information obtained through a flicker sensor of the electronic device satisfying a designated condition.

20. The method of claim 19, wherein determining the camera for obtaining the image further comprises:
    determining the first camera as the camera for obtaining the image among the first camera and the second camera, based on the maximum value of the one or more first peaks being greater than or equal to the second value and information obtained through at least one of the flicker sensor or an illuminance sensor of the electronic device satisfying a designated condition.

* * * * *